(12) United States Patent
Hanback

(10) Patent No.: US 11,566,819 B2
(45) Date of Patent: Jan. 31, 2023

(54) METHOD AND SYSTEM FOR DEEP-DRILLING FOR RENEWABLE ENERGY

(71) Applicant: Mass Flow Energy, Inc., Jeffersonton, VA (US)

(72) Inventor: John Wesley Hanback, Jeffersonton, VA (US)

(73) Assignee: Mass Flow Energy, Inc., Jeffersonton, VA (US)

( * ) Notice: Subject to any disclaimer, the term of this patent is extended or adjusted under 35 U.S.C. 154(b) by 0 days.

(21) Appl. No.: 17/658,364

(22) Filed: Apr. 7, 2022

(65) Prior Publication Data

US 2022/0333827 A1 Oct. 20, 2022

Related U.S. Application Data

(60) Provisional application No. 63/258,153, filed on Apr. 15, 2021.

(51) Int. Cl.
| | |
|---|---|
| *F24T 10/13* | (2018.01) |
| *F24T 10/20* | (2018.01) |
| *E21B 7/04* | (2006.01) |
| *E21B 19/16* | (2006.01) |
| *F24T 10/00* | (2018.01) |
| *E21B 19/06* | (2006.01) |

(52) U.S. Cl.
CPC ............... *F24T 10/13* (2018.05); *E21B 7/04* (2013.01); *E21B 19/16* (2013.01); *F24T 10/20* (2018.05); *E21B 19/06* (2013.01); *F24T 2010/53* (2018.05)

(58) Field of Classification Search
None
See application file for complete search history.

(56) References Cited

U.S. PATENT DOCUMENTS

| | | | |
|---|---|---|---|
| 4,090,572 A * | 5/1978 | Welch | E21B 7/15 219/121.84 |
| 6,591,916 B1 | 7/2003 | Ayling | |
| | | (Continued) | |

OTHER PUBLICATIONS

International Search Report issued in PCT/US22/71620, dated Jun. 21, 2022.

*Primary Examiner* — Michael R Wills, III
*Assistant Examiner* — Neel Girish Patel
(74) *Attorney, Agent, or Firm* — Ice Miller LLP

(57) ABSTRACT

A multivessel system is provided for drilling an ultra-deep borehole into the Earth's lithosphere. The system includes a plurality of gate valves, a first pressure vessel configured with a first vessel elevator that engages and holds a train section as the first vessel elevator moves in the first pressure vessel along a portion of a length of a drill train channel; a second pressure vessel configured with a second vessel elevator that engages and holds the train section as the second vessel elevator moves in the second pressure vessel along another portion of the length of the drill train channel; a third pressure vessel configured with a smooth cylinder bore and a burn gas ejection piston configured to hold and connect the train section to the drill train; an input-output separator configured to segregate an exhaust waste gas up-flowing from the borehole from a gas being supplied into the borehole; and a drill train clamp configured to engage and hold a drill train in a borehole.

17 Claims, 11 Drawing Sheets

(56) References Cited

U.S. PATENT DOCUMENTS

| | | | |
|---|---|---|---|
| 6,615,931 B2 | 9/2003 | Dycus et al. | |
| 8,393,410 B2* | 3/2013 | Woskov | E21B 7/14 |
| | | | 175/11 |
| 9,816,538 B1* | 11/2017 | Wagner | E21B 17/01 |
| 9,890,594 B2* | 2/2018 | Hanback | E21B 7/15 |
| 2005/0077049 A1* | 4/2005 | Moe | E21B 19/006 |
| | | | 166/355 |
| 2010/0252324 A1* | 10/2010 | Woskov | E21B 7/14 |
| | | | 166/308.1 |
| 2011/0115223 A1* | 5/2011 | Stahlkopf | H02P 9/04 |
| | | | 290/7 |
| 2012/0227925 A1* | 9/2012 | Sweeney | F01K 3/186 |
| | | | 165/10 |
| 2014/0034329 A1* | 2/2014 | Skinnes | E21B 19/006 |
| | | | 166/355 |
| 2014/0130498 A1* | 5/2014 | Randolph | E21B 43/164 |
| | | | 166/267 |
| 2014/0158425 A1* | 6/2014 | Bozso | E21B 7/15 |
| | | | 175/16 |
| 2014/0305635 A1 | 10/2014 | Linetskiy et al. | |
| 2015/0176333 A1* | 6/2015 | Hanback | E21B 7/15 |
| | | | 175/16 |
| 2015/0300103 A1 | 10/2015 | Noordstrand | |
| 2018/0100385 A1* | 4/2018 | Elmer | E21B 43/168 |
| 2022/0357719 A1* | 11/2022 | Stout | G06T 7/0004 |

\* cited by examiner

METHOD AND SYSTEM FOR DEEP-DRILLING FOR RENEWABLE ENERGY

CROSS REFERENCE TO RELATED APPLICATIONS

This application is entitled to and hereby claims priority under 35 U.S.C. § 119(e) to provisional U.S. patent application, Ser. No. 63/258,153, filed Apr. 15, 2021, titled, "Mass Flow Power Energy Production Process and System," which is hereby incorporated herein in its entirety.

TECHNICAL FIELD

The present disclosure relates to geothermal power conversion, and, more particularly, to a method, a system, an apparatus and a computer program for deep drilling a borehole for geothermal energy extraction.

BACKGROUND

The Earth's core is made up of a number of layers, with the outermost layer being the lithosphere and the innermost layer being the inner core. The lithosphere comprises the Earth's crust, a shell that lies atop of the mantle and has an average thickness estimated to be between about nine miles (9 mi) and twelve miles (12 mi). The mantle lies atop of an outer core, which in turn lies atop of an inner core that has a radius estimated to be around seven-hundred-sixty miles (760 mi). The temperature increases with depth, with the temperature of the crust increasing as much as forty-eight degrees Centigrade (48° C.) for every mile, with values typically about six-hundred-degrees Centigrade (600° C.) at the boundary with the mantle.

The geothermal aspects of the Earth's core have been used as a renewable energy source for a long time, with applications in heating systems and geothermal power systems.

Conversion of geothermal energy to electric form has traditionally been a marginally economic and inefficient endeavor. However, by developing new drilling techniques capable of reaching unprecedented depths, new and highly efficient geothermal facilities can be created.

SUMMARY

The present disclosure provides a method, system, apparatus and computer program for deep drilling a borehole for geothermal energy extraction. A multivessel system is provided, comprising a plurality of pressure vessels for drilling an ultra-deep borehole into the Earth's lithosphere. In an embodiment the system comprises: a plurality of gate valves, each gate valve being configured to provide a hermetic seal between at least two spaces; a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a drill train channel, the first pressure vessel further comprising a first vessel downstream opening; a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the drill train channel, the second pressure vessel further comprising a second vessel downstream opening; a third pressure vessel comprising a third vessel upstream opening configured to receive the train section from the second vessel downstream opening through a third one of said plurality of gate valves and a third vessel containing a waste gas extraction piston configured to seal and hold pressure and connect the train section to the drill train, the third pressure vessel comprising a third vessel downstream opening; an input-output separator configured to segregate an exhaust waste gas up-flowing from the borehole from a gas being supplied into the borehole; and a drill train clamp configured to engage and hold a drill train in a borehole. Each of said first vessel elevator and said second vessel elevator can include a clamp configured to engage and hold the train section as the respective first vessel elevator or the second vessel elevator moves along the drill train channel.

A multivessel system is provided comprising a plurality of pressure vessels for drilling an ultra-deep borehole into the Earth's lithosphere. In an embodiment, the system comprises: a plurality of gate valves, each gate valve being configured to provide a hermetic seal between at least two spaces; a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a drill train channel, the first pressure vessel further comprising a first vessel downstream opening; a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the drill train channel, the second pressure vessel further comprising a second vessel downstream opening; and a drill train clamp configured to engage and hold a drill train in a borehole. Each of said first vessel elevator and said second vessel elevator can include a clamp configured to engage and hold the train section as the respective first vessel elevator or the second vessel elevator moves along the drill train channel.

In an embodiment, the multivessel system can further comprise a third pressure vessel comprising a third vessel upstream opening configured to receive the train section from the second vessel downstream opening, wherein at least one of the first pressure vessel, the second pressure vessel and the third pressure vessel comprises a robotic arm that is configured to connect the train section to the drill train.

The first vessel elevator or the second vessel elevator can comprise an internal spiral hydraulic ball screw elevator.

The clamp can include a plurality of hydraulic conical clamping mechanisms for clamping at least one a waveguide, a drill tube, a water cooling system, an electrical supply cable, a gas supply, an ancillary material and whisker feed, and a burn gas waste tube.

The third pressure vessel can include a smooth internal cylinder bore and a piston having an internal pressure sealing hydraulic drill pipe clamp attached to the second vessel elevator by a fixed steel tube to allow an exhaust waste gas to be separated from at least one of a cooling liquid, an electrical supply cable, a gas supply, and an ancillary material and whisker feed.

In an embodiment, the multivessel system can include an input-output separator configured to segregate an exhaust waste gas up-flowing from the borehole from a gas supply to the borehole.

In an embodiment, the multivessel system can include a fixed hydraulic conical clamp located between the third pressure vessel and a gas flow separator.

In an embodiment, the multivessel system can include an energy beam drill, wherein the energy beam drill comprises at least one of a plasma-arc infrared beam drill, a laser guided plasma beam drill and a direct electrical discharge energy drill.

The plasma arc infrared energy beam drill can be attached to the drill tower; the energy beam drill can include an extendable drill tube; and the multiple waveguides can be configured to drill the borehole and form a ceramic borehole liner by transmitting a directed energy beam to vaporize rock in a geological formation.

The laser-guided plasma beam drill and the direct electrical discharge energy drill can be attached to the distal end of the drill train and can be configured to drill the borehole and form a ceramic borehole liner by transmitting a directed energy beam to vaporize rock in a geological formation.

The drill train can be configured to hold and lower the drill train as it descends through a geological formation to form a ceramic borehole liner at the circumference of the borehole, while maintaining a predetermined fixed distance between energy beam drill and a melt created at a bottom of the borehole.

The drill train can include a carbon fiber-ceramic layer.

The drill train can include a super insulating graphene layer.

The multivessel system can include a particle separator configured to segregate fine particles from an exhaust waste gas.

The drill train can include a water-cooling layer.

The drill train can include high temperature Hastelloy X or nickel alloy.

The ancillary material and whisker feed can include a ceramic powder and ceramic whiskers.

The drill train can include train connectors between each pair of train sections.

The drill train connectors can each include an upstream sub-connector and a downstream sub-connector.

A method is provided for drilling an ultra-deep borehole into the Earth's lithosphere. In an embodiment, the method comprises: depressurizing a first pressure vessel having a first vessel upstream opening, a drill channel, and a first vessel downstream opening; opening a first gate valve to provide access to the first vessel upstream opening; inserting a train section through the first vessel upstream opening into the first pressure vessel; clamping and holding, by one of a plurality of elevators equipped with a clamp, the train section in the first pressure vessel; closing the first gate valve and pressurizing the first pressure vessel; opening a second gate valve located downstream of the first vessel downstream opening; clamping and lowering, by activating movement of another one of the plurality of elevators, the train section into a second pressure vessel; closing the second gate valve and depressurizing the first pressure vessel; moving said another one of the plurality of elevators downward until the train section contacts or is within a predetermined distance of an upstream end of a drill train equipped at a downstream end with an energy beam drill; connecting, by a robot, the train section to the upstream end of the drill train; and lowering the drill train into a borehole to melt and vaporize rock, by the energy beam drill, and form a ceramic borehole liner while maintaining the pressure in the borehole at a predetermined pressure value.

In an embodiment, the connecting the train section to the upstream end of the drill train can include robotically screwing the train section to the upstream end of the drill train, wherein the train section and the upstream end of the drill train comprise male and female threads.

In an embodiment, the connecting the train section to the upstream end of the drill train can include robotically inserting bolts in the drill train connectors and robotically torquing the bolts, joining the units.

In an embodiment, the method includes converting a borehole liner to a form of silicon nitride or aluminum nitride or other similar ceramic, depending on whether strength or heat transfer is desired.

In an embodiment, the method includes maintaining constant pressure in the borehole while being able to continuously add new drill tubes and waveguides as the borehole goes deeper.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
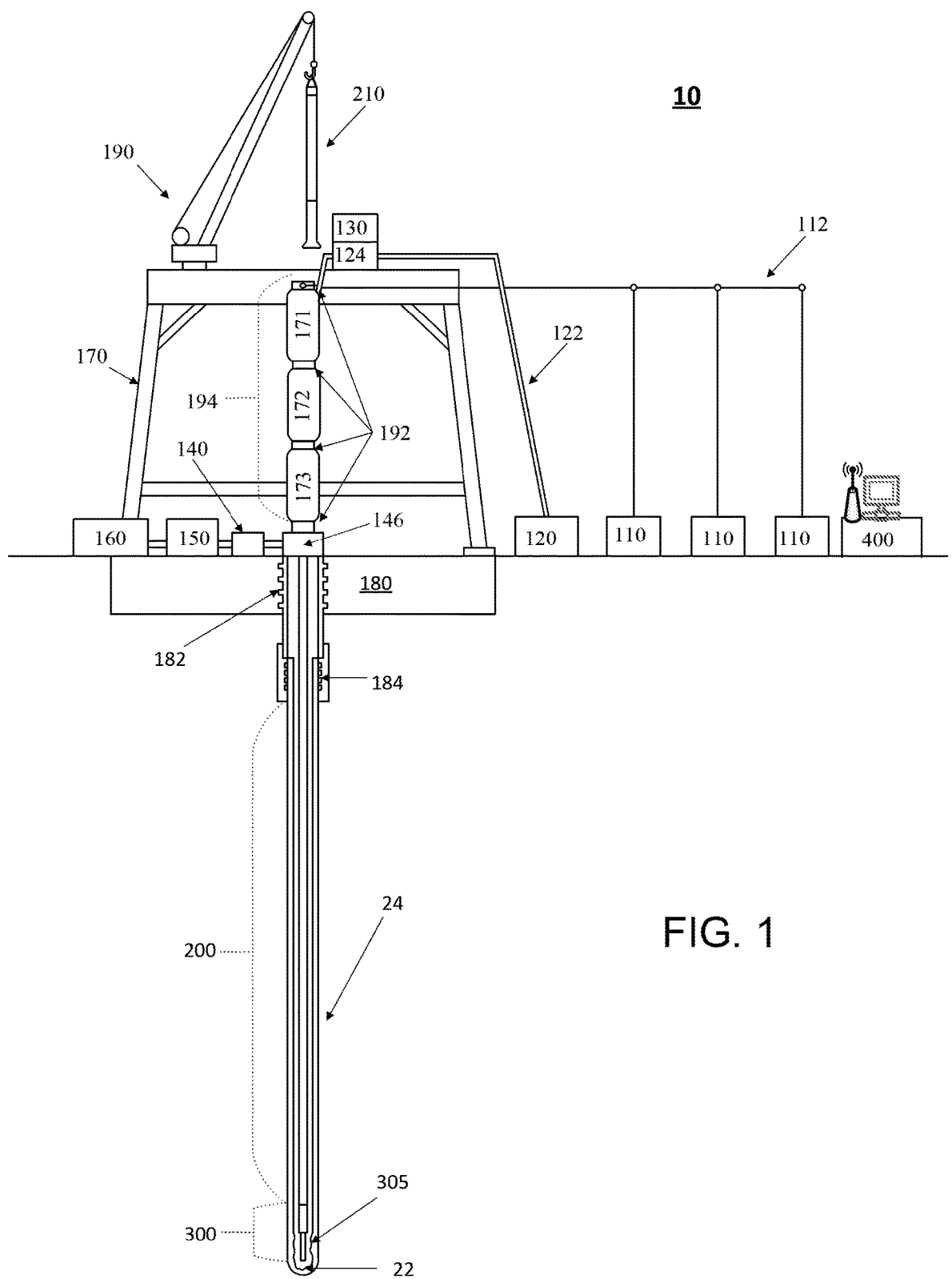
FIG. 1 depicts an embodiment of an ultra-deep well (UDW) drilling system.

The present disclosure is further described in the detailed description that follows.

DETAILED DESCRIPTION

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

State-of-the art borehole well drilling systems use mechanical drills that include the implementation of well drilling mud to remove the fractured and ground particles from the borehole and to provide pressure to prevent the borehole from collapsing. Such systems typically have practical depth limits around 20,000 feet deep. While such depth limits might be adequate for oil and gas recovery, they are insufficient for geothermal applications. Such depth limits provide only minimal heat for geothermal use, about 360° F. on average. This is not hot enough for economical large scale power production.

U.S. Pat. No. 9,890,594 entitled "Advanced Drilling Systems and Methods," issued Feb. 13, 2018, to the inventor of the instant disclosure, John Hanback, which is hereby incorporated in its entirety, describes new systems and methods capable of reaching unprecedented depths. The systems and methods described in the patent facilitate creation of highly efficient geothermal facilities. The patent describes a gyrotron drilling system that can be used to melt rock and other strata as the drilling system progresses vertically downward into the Earth's crust. Details of the gyrotron drilling system can be found in U.S. Pat. No. 8,393,410 entitled "Millimeter-Wave Drilling System," issued Mar. 12, 2013, to Paul P. Woskov, et al., which is hereby incorporated in its entirety.

FIG. 1 depicts an embodiment of an ultra-deep well (UDW) drilling system 10, constructed according to the principles of the disclosure. In various embodiments of the disclosure, the UDW drilling system 10 includes a drill train 200 and an energy beam (EB) drill 300 that can melt and vaporize the hard and rigid outer vertical layer of the Earth's crust as the drill train progresses deeper into the Earth's lithosphere. The UDW drilling system 10 can include a controller 400, which can be configured to monitor, manage and control system parameters during operation of the UDW drilling system 10. The EB drill 300 can include one or more drill guns, including a plasma-arc infrared (PAIR) beam drill gun, a laser-guided plasma (LPG) beam drill gun, and a liquid-cooled direct electrical discharge (DED) gun. The one or more drill guns can be operated at the surface or lowered down a borehole 20, depending on the particular application. The EB drill 300 can be attached to the drill train 200.

In an embodiment, the EB drill 300 can include a directed energy drill, a water cooled, direct electrical discharge energy drill or a laser guided plasma beam drill mounted on a leading end of a first train section 210 in the drill train 200.

In an embodiment, the EB drill 300 can include a laser guided plasma beam drill mounted on a leading end of a first installed train section.

In an embodiment, the EB drill 300 can include a plasma-arc infrared beam drill mounted on a leading end of a first installed train section 210, or mounted on the drill tower, and a plurality of waveguides mounted after the plasma-arc infrared beam drill to project the infrared beam down the borehole 20. In the embodiment depicted in FIG. 1, the EB drill 300 includes a waveguide 305 that is configured to focus electromagnetic (for example, infrared or IR) energy toward the bottom of the borehole 20.

The EB drill 300 can be configured to melt and then vaporize rock. In various embodiments, the EB drill 300 can include one or more EB drill guns, which can be operated at the surface and/or lowered down the borehole 20, depending on the type of drill gun. One or more of the EB drill 300 guns can be attached to the drill train 200, which can comprise a light-weight carbon fiber ceramic or carbon fiber-high temperature nickel alloy drill tube or waveguide.

In an embodiment, the EB drill 300 can be configured to be robotically attached, for example, in a multivessel system 194 (shown in FIGS. 1, 3, 4), to the top of an uppermost extendable waveguide (for example, waveguide 305 shown in FIG. 1). Then, when the burn begins and when the hydraulic ball screw elevator 1905 (shown in FIGS. 3, 4) is lowered, the extendable waveguide expands downward. Then at the completion of a burn, the expandable wave guide can be retractable upward and re-attachable to the next waveguide when it is installed under the expandable waveguide in another drill tube 200.

The UDW drilling system 10, using directed energy beam (EB) drilling, can enable quantitative new diagnostic approaches not possible with existing mechanical drilling systems. For instance, in an embodiment, the UDW drilling system 10 can be configured to multiplex onto a heating beam remote radar system (not shown) and monitor, for example, using a radiometer (not shown), the drilling operation itself by providing borehole rock temperature, and, sampling the vaporized off gas flow by a slip stream in real time to characterize the chemical composition of the formation being penetrated. This information can be of significant importance to geologists reading and categorizing the geological composition of the borehole and can assist in avoiding hazards as the well is mapped.

In various embodiments, the UDW drilling system 10 can be implemented with any of a number of continuous emissions monitoring (CEM) technologies that can be employed at the surface, near the borehole 20. Such technologies can include, for example, a microwave plasma torch coupled with atomic emission spectroscopy. The microwave torch can operate in ambient gas flow to excite all the entrained elements to emit their characteristic fingerprint spectra for identification. The CEM technology can be included to monitor trace metals. Once the elemental distribution in the off gas is obtained, the underlying mineral content can be inferred. Other diagnostic techniques using commercial instrumentation, such as gas chromatography and Fourier transform infrared (FTIR) spectroscopy can be included and used to monitor the presence of gaseous species such as hydrocarbons and hydrogen sulfide.

The drill train 200 can include at least a drill tube or a waveguide, or both a drill tube and a waveguide. The drill train 200 can include a plurality of channels, any one or more of which can be used to supply energy, material, liquid, or gas from above ground to the bottom of the borehole 20, or to return energy, material, liquid, or gas from the bottom of the borehole 20 to above ground. The drill train 200 can include any number of channels, ranging from a single channel to a complex network of channels, such as, for example, the multi-channel embodiment depicted in FIG. 7. The drill train 200 can include one or more channels configured to contain a power supply cable, a coolant supply, pressurized nitrogen purge gas supply, a return, a waste gas exhaust, and an ancillary material and whisker supply. One or more of the channels in the drill train 200 can be configured to include a drill tube or a waveguide, or configured as a drill tube or a wave guide.

Figure 7:
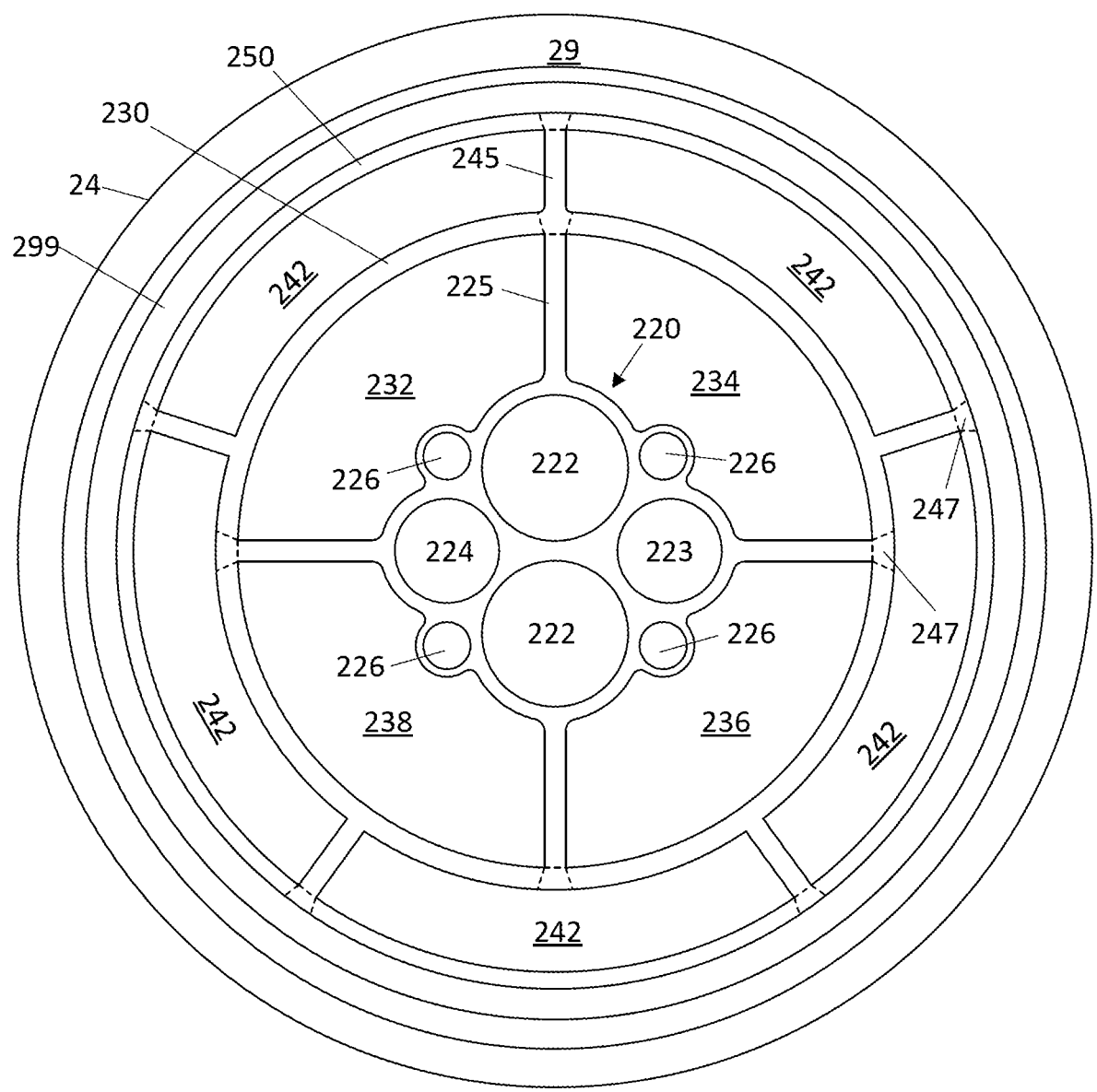
FIG. 7 depicts a cross-section cut view of an embodiment of a drill train.

Each channel in the drill train 200 can be separated and sealed from each other channel in the drill train 200, for example, as seen in the embodiment depicted in FIG. 7. The drill train 200 can be assembled (and disassembled) as a plurality of discrete train sections 210. The drill train 200 can include train connectors between each pair of train sections 210. The drill train 200 can include ceramic or carbonized phenolic resin binders and carbon fiber wound around thin grooved gold, copper or silver plated Hastelloy X or high temperature nickel alloy materials with Hastelloy X or high temperature nickel alloy carbon fiber end connectors cast into the plurality of train sections 210 with an outer carbon fiber ceramic powder supply area.

In various embodiments, the drill train 200 can include carbon fiber/ceramic pressure vessel pipes wherein the Hastelloy X or high temperature nickel alloy pressure vessel connectors are attached to the carbon fiber/ceramic pressure vessel pipes by wrapping the carbon fiber around the grooved insertion end of the Hastelloy X connectors, immersing the pressure vessel pipe portion of the assembly in ceramic binder or a phenolic resin and then firing them to complete a ceramic composite pipe system.

In an embodiment, the drill train 200 can include a plurality of super-insulated train sections 210.

In an alternative embodiment, the train sections 210 can be connected to each other, for example, via threading, without train connectors.

In an embodiment, the drill train 200 can include a waste gas exhaust channel and a ceramic powder supply area with a flared end allowing ceramic powder and whiskers to be injected into the molten borehole wall located outside of at least one drill tube or at least one waveguide. The drill train 200 can include one or more borehole sealing material supply channels configured with spray nozzles located above a flared end of the ceramic infusion area that can deliver a high temperature sealant to the borehole 20 when the drill train 200 is going into or being raised out of the borehole 20.

In an embodiment, a thin layer of fine particles can be included to super-insulate the drill train 200 or the wall casing 24 of the borehole 20. The fine particles can be supplied via the drill train 200 to insulate, for example, the first 11,000 feet, or more, of the borehole lining. In an embodiment, the thin layer of fine particles can be held with a sleeve insertable in the borehole 20. The sleeve can include one or more pressure-sealed carbon fiber/ceramic sleeves with a vacuum applied after installation, or, as an alternative, a layer of super insulating graphene contained in a carbon fiber/ceramic sleeve or a high temperature nickel alloy sleeve.

In an embodiment, the thin layer of graphene can be protected and held in place by a thin high temperature nickel alloy foil and then arc sprayed with a high temperature nickel alloy and inserted in the uppermost 11,000 feet or more circumference of the borehole. The sleeve can be attached to the ceramic borehole lining. The thin layer of fine particles can include graphene, ground fly ash or perlite.

In an embodiment, the drill train 200 can include at a bottom of a lowermost train section 210 a plurality of radial-extending, curved and flexible spars. Each spar can include a pressure or contact sensor so that when a particular spar comes into contact with a portion of the borehole, including a spur or outcropping in the ceramic borehole well casing 24, the pressure or contact sensor making or breaking a circuit monitored at the surface can identify an anomaly. The sensor signals can be monitored at the surface by the controller 400 and, when an anomaly is detected, the controller 400 can cause drilling to cease or slow so that the anomaly can be corrected before drilling resumes.

The drill train 200 can comprise a light weight, high-strength material such as, for example, a light-weight carbon fiber ceramic or a carbon fiber-high temperature nickel alloy. The ancillary material can include, for example, a ceramic powder. The whiskers can include heat-resistant compounds that can serve as reinforcement fibers for the ancillary material, such as, for example, silicon carbide (SiC), aluminum carbide ($Al_4C_3$) or other compounds exhibiting similar properties. The whiskers can include ceramic whiskers. The pressurized purge gas can include an inert gas such as, for example, nitrogen ($N_2$), argon (Ar), or helium (He). The pressurized purge gas can include a purified inert gas such as purified nitrogen gas.

The drill train 200 includes, and is formed by, a plurality of train sections 210, each of which can be connected to an adjacent train section 210 with a drill train connector. In an alternative embodiment, each train section 210 can be connected to a preceding train section 210 in the drill train 200. The train connector can include, for example, a Hastelloy X or other high temperature nickel alloy. The train connector can include, for example, bolts or threaded-sleeve connectors.

The length of the drill train 200, which in an embodiment comprising 53-foot-long train sections can have 1,132 train sections, or more, for a borehole depth of 60,000 feet deep, or deeper.

In an alternative embodiment, each train section 210 can be 26.5 feet long. Other lengths are also contemplated here, including lengths less than 26.5 feet and greater than 53 feet. The length of the train section 210 can be determined based on, for example, the delivery mechanism (for example, trailer or crane) used to deliver or install the train section 210.

In an embodiment, the UDW drilling system 10 can be configured to penetrate to about 60,000 feet, or deeper into the Earth's lithosphere, to provide working fluid well temperatures of about 1,000° F. to about 1,300° F., or greater.

During drilling, the high heat of the drill guns causes a vitreous lining to form at the melt area 22 along the circumference of the borehole 20. As the EB drill 300 with drill guns move downward and melts rock and other materials in the lithosphere, the melt forms a vitreous lining, creating the borehole wall casing 24 around the inner circumference of the borehole 20. In an embodiment, the borehole wall casing 24 includes a ceramic liner formed by the vitreous lining that coats the borehole wall. The borehole wall casing 24 can eliminate any need for a standard well casing to be installed.

The borehole wall casing 24 can be made much stronger by injecting the ancillary material and whiskers into the melt area 22. A purge gas such as nitrogen can be combined with the ancillary material (for example, ceramic powder) and whiskers to create, for example, a form of silicon nitride ($Si_3N_4$), aluminum nitride (AlN), or similar ceramic well casing 24 in the borehole 20. The borehole wall casing 24 can be configured to conduct heat and help prevent collapse in the borehole 20.

In various embodiments, the thickness of the borehole wall casing 24 can be controlled by the controller 400. In an embodiment, the controller 400 can be configured to increase a thickness of the wall casing 24. For instance, depending on depth and lithostatic and hydrostatic pressures, the UDW drilling system 10 can be configured to increase a thickness of the borehole wall casing 24 to counterbalance the increasing pressures as the borehole 20 becomes deeper. This can be facilitated by supplying, under control of the controller 400, in addition to the pressure of the waste gas that is formed from vaporization of the material (for example, rock) in the borehole 20, the purge gas at a ultra-high pressure, such as, for example, above 40,000 pounds-per-square-inch (psi), and preferably between about 55,000 psi and about 65,000 psi The pressure at which the purge gas is supplied to the borehole 20 can be controlled and adjusted as a function of the depth of the borehole 20, with the pressure being increased as the UDW drill system 10 drills deeper into lithosphere and deepens the borehole 20.

In an embodiment, the pressure can be maintained or adjusted by the controller 400 by adjusting a well bore entrance control pressure/flow via an inlet pressure control valve system 148 (shown in FIG. 3) and a well bore exit pressure/flow via an outlet pressure control valve system 140, using the borehole gases acting as a counter pressure to the Earth's ever-increasing lithostatic pressure as the UDW drill system 10 drills deeper. This pressure control, combined with the light weight of the drill train 200 (compared to state-of-the-art well casing or borehole tubing), allows the UDW drill system 10 to reach extreme depths, such as, for example: between about 20,000 feet and about 60,000 feet, or more; between about feet, 41,000 and about 60,000 feet, or more; or in excess of 60,000 feet.

In various embodiments, the EB drill 300 can be affixed to the bottom of the drill train 200 or to a drill tube or waveguide extensions after the EB drill (not shown) provided in the drill train 200. The EB drill 300 can include one or more drill guns, including a water-cooled plasma-arc infrared (IR) beam drill gun, a water-cooled laser-guided plasma beam drill gun, and a water-cooled direct electrical discharge gun. The EB drill 300 can include the waveguide 305. The plasma arc infrared drill 300 can include one or more sensors (not shown), including a temperature sensor and a distance sensor that can measure the distance between the melt zone 22 and the EB drill 300 or the drill train 200. The sensor(s) (not shown) can be connected via one or more communication links to the controller 400, which can be configured to receive sensor signals and monitor and log conditions and materials in the borehole 20, including, for example, information regarding pressure, temperature, and types, quantities and concentrations of materials output from the UDW drilling system 10, as the EB drill 300 progresses downward through the Earth's lithosphere.

The drilling platform 100 can include any combination of a power supply 110, a power line 112, a power generator 120, a gas supply line 122, a compressor 124, an ancillary material and whisker (AMW) injector 130, an outlet pressure control valve system 140, an inlet pressure control valve system 148, a particle separator 150, a fine mineral collector 160, a drilling tower 170, a well foundation 180, and a crane 190. The drilling platform 100 can include a multivessel pressure vessel system 194, a vessel-foundation connector (not shown), and the controller 400. Any one or more of the components can be affixed to, co-located with, or located apart from the drilling platform 100. The outlet pressure control valve system 140 can include a fluid flow control and a well pressure control (FCPC) valve system. The inlet and outlet (TO) pressure control valve system 140 can include shutoff valves (not shown) that can hermetically seal the borehole 20 from the rest of the UDW drilling system 10, such that the shutoff valves can be closed and any of the components of the system 10 removed, including, for example, an input-output (TO) flow separator 146 or the multivessel system 194.

For example, the shutoff valve (not shown) can be closed after drilling stops, the borehole 20 is completed, and drill train 200 with EB drill 300 is removed from the borehole 20 by operating the UDW drilling system 10 according to a reverse process, a drill train removal process.

The power generator 110 can include, for example, a geothermal powered generator, a diesel power generator, a gas power generator, a solar powered generator, a wind powered turbine generator, a wave-powered generator, a power generation station, or an electrical power grid. The power generator 110 can be electrically coupled to the power lines 112.

The power line 112 can include, for example, a high wattage power cable. The power line 112 can be coupled electrically to the power generator 110 at one end and to the drilling platform 100, the drill train 200, the EB drill 300 and the controller 400 at another end. The power line 112 can be configured to carry electrical power from the power generator 110 to any component in the UDW drilling system 10, including a robotic system (not shown) included in the multivessel system 194, that can use electrical power to operate.

The gas generator 120 can include a generator, or a gas supply line containing, for example, a gas such as nitrogen. The gas can be supplied to the compressor 124 via the gas supply line 122, where the gas can be compressed before being supplied via one or more gas inlet valves 125 (shown in FIG. 3) to pressure vessels 171, 172, 173 in the multivessel system 194 as an ultra-pressurized gas. The gas generator 120 can be configured to provide substantially pure gas such as nitrogen, which can be sufficiently concentrated and devoid of other gases, such as, for example, oxygen or water vapor, so as to prevent any dangerous levels of combustion within the borehole 20.

Figure 2:
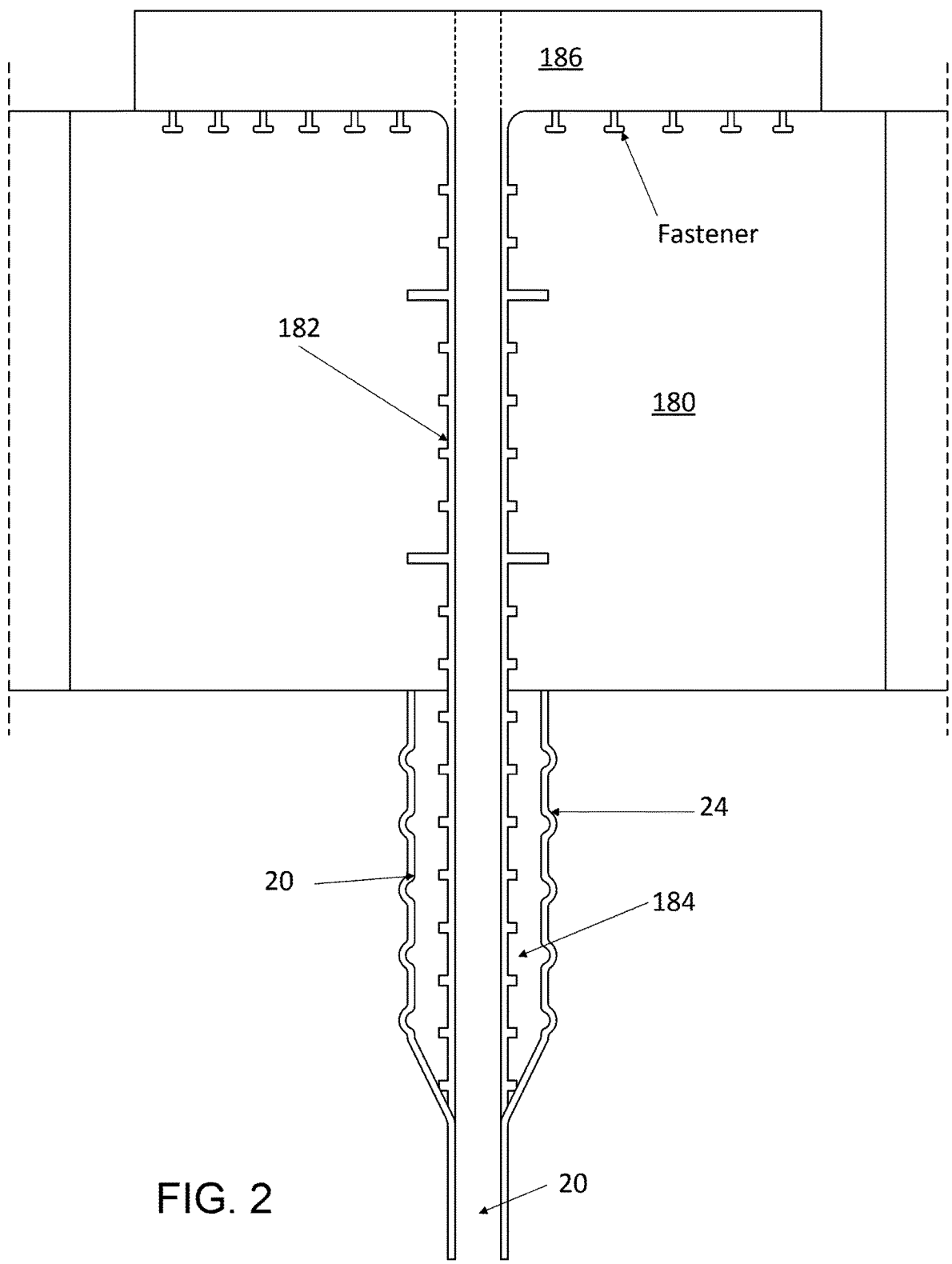
FIG. 2 depicts a cross-section view of an embodiment of a well foundation and well cap system attached to a wall casing of a borehole.

FIG. 2 depicts a cross-section view of an embodiment of the well foundation 180, including a well cap system, attached to the wall casing 24 of the borehole 20. As seen in the depicted embodiment, the well cap system can include a well-cap casting 182, a metal well seal 184, and a borehole liner high-temperature metal casting 186. The high-temperature metal casting 186 can be configured to house and/or support an inlet-outlet (IO) flow separator 146. The metal casting 186 can include a shutoff valve (not shown) that hermetically seals the borehole 20 from the surrounding environment.

Referring to FIG. 2, before the drilling tower 170 is installed, the borehole 20 can be initiated by employing a large piling drill (not shown) to penetrate any existing dirt overburden and create an oversize borehole in the rock. Then the well-cap casting 182 can be installed and locked in place by the well foundation 182, which can include concrete poured around the well-cap casting 182 and allowed to cure. The high-temperature metal casting 182 can be attached to the well foundation by means of, for example, concrete studs 185.

The well-cap casting 182 can include a ribbed borehole liner and extend down until it reaches and penetrates solid rock. Then, the drilling tower 170 can be installed and the EB drill 300 can be engaged to begin drilling the borehole 20 while forming and lining the inner walls of the borehole with the vitreous wall casting 24.

In an alternative embodiment, the drilling tower 170 can be installed before the borehole 20 is initiated. In that embodiment, the drilling tower 170 can be used to support the large piling drill.

The metal well seal 184 can be formed using, for example, an induction coil (not shown) and metal balls (not shown) after an initial portion of the borehole has been vaporized in solid rock. For instance, in one non-limiting approach, after a 20-foot (or deeper) borehole has been formed in solid rock, the EB drill 300 can be removed and the borehole opening temporarily sealed where the vitreous borehole begins. Then, metal balls can be poured into the open space between the ribbed well-cap casting 182 and the vitreous wall casting 24. At that time the induction coil (not shown) can be energized, which can be preferably placed in close proximity to the intersection of the metal well-cap casting 182 and the vitreous wall casting 24, to melt the metal balls, thereby forming the metal well seal 184 as a complete high strength seal between the well cap liner and the vitreous liner. At that point, the energy beam drill can be reintroduced into the borehole and drilling continued to full depth.

Referring back to FIG. 1, the drilling platform 100 can be configured to deliver each train section 210 to an insertion site on the platform and align, insert, and guide each train section 210 into the multivessel pressure vessel system 194. The drilling platform 100 can be further configured to deliver each train connector to the multivessel system 194. The train section 210, after being coupled to the preceding train section, for example, using the train connector, can move downward as the drill train 200 progresses into the borehole 20. Simultaneously, the pressure in the borehole 20 and the UDW drill system 10 can be increased, reduced, or maintained at a predetermined pressure value, to optimize operation of the EB drill 300 in the melt zone 22 and formation of the vitreous borehole well casing 24.

The drill train 200 includes a plurality of train sections 210 and train connectors. Each train section 210 can be connected to a previous, adjacent train section 210 with the train connector, which can include Hastelloy X or other high temperature nickel alloy. The train connector can include, for example, bolts or threaded-sleeve connectors that can be installed by the robotic system (not shown) in the multivessel system 194.

Figure 8:
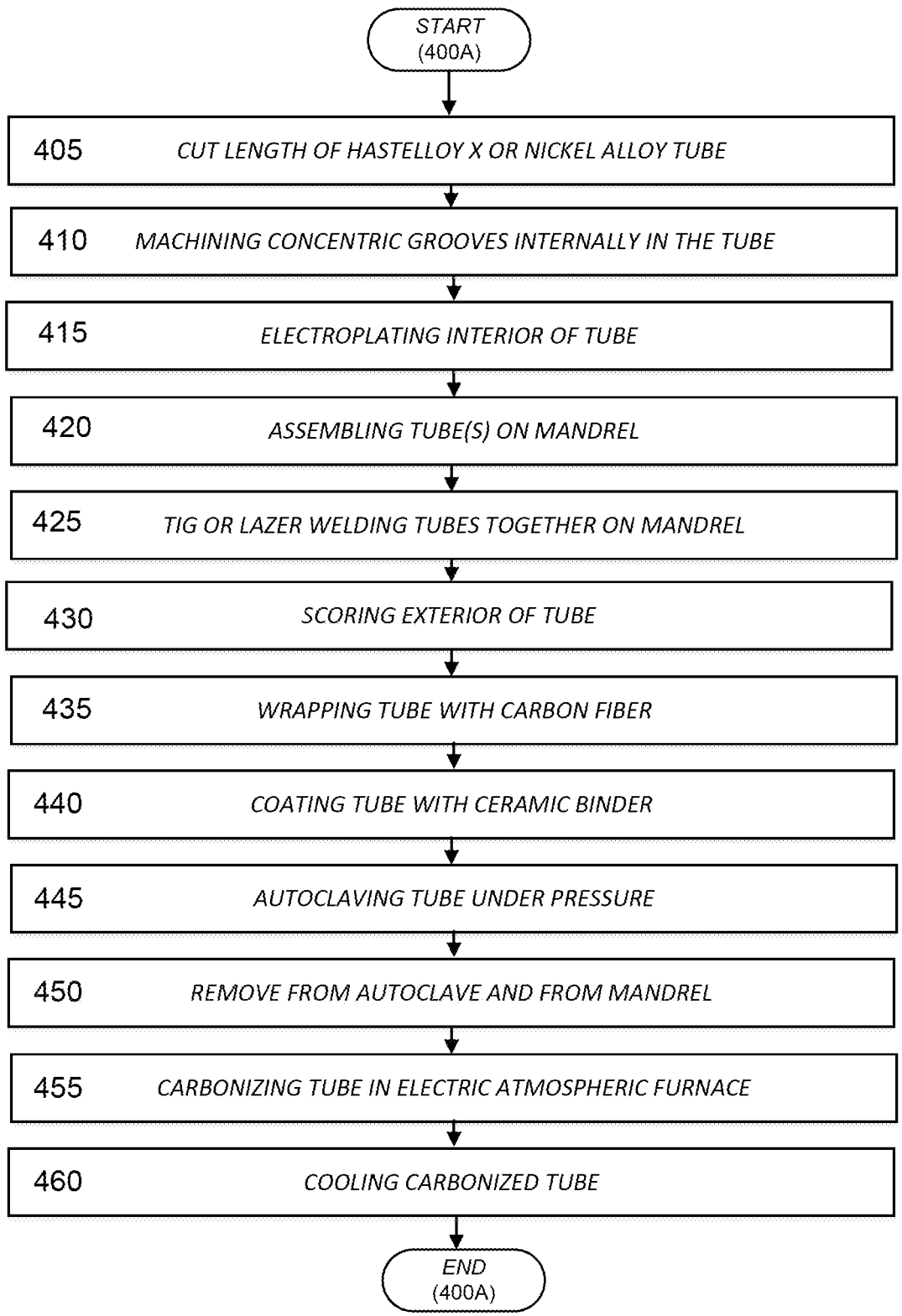
FIG. 8 depicts an embodiment of a process for manufacturing wave guide tubes.
Figure 9:
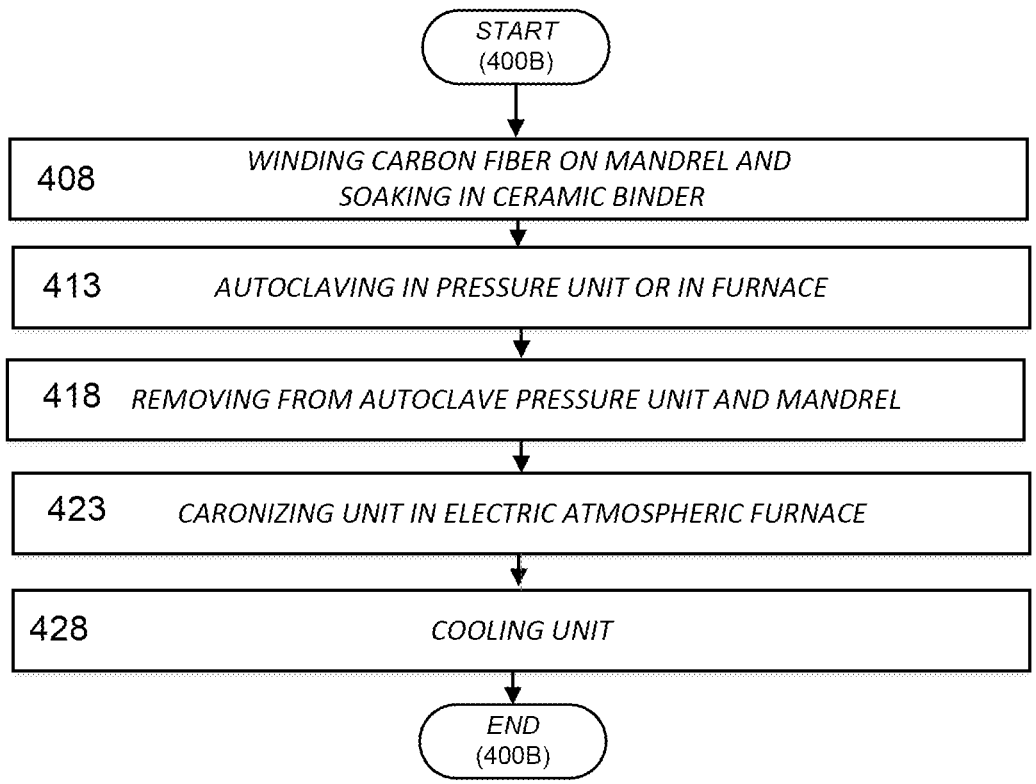
FIG. 9 depicts an embodiment of a process for manufacturing energy beam drilling tubes.

Parts of the drill train 200, including, for example, the train sections 210 or train connectors, can be made according to a manufacturing process such as, for example, process 400A or 400B, in FIGS. 8 and 9, respectively.

In an embodiment, the drill train 200 can be moved downward into the borehole 20 at a speed such that the EB drill 300 maintains a constant, optimal distance to the melt zone 22 in the borehole 20. As the EB drill 300 is moved vertically downward into the lithosphere, the melt zone 22 progresses downward, deepening the borehole 20 and, at the same time, continuing to form the borehole wall casing 24 in the process. The rate at which the drill train 200 and EB drill 300 move downward can be controlled by the UDW drilling system 10, for example, under control of the controller 400. The rate at which the drill train 200 progresses can vary based on factors such as, for example, the rate at which the EB drill 300 vaporizes rock and other materials, the type of material encountered by the EB drill 300, or the type of EB drill gun used. The controller 400 can be configured to control the rate at which the drill train 200 progresses by, for example, controlling the power supplied to the EB drill 300, the pressure or rate at which purge gas is injected or released from the system, the feed rate of ancillary material or whiskers supplied by the AMW injector 130, or operation of the multivessel system 194.

In an embodiment, as the EB drill 300 vaporizes the rock at the bottom of the borehole 20, nanoparticles (for example, 5 to 10 nanometers in size) of rock that result (essentially a gas) can be discharged up the well bore as a waste gas extraction, for example, in an exhaust (or burn) gas return area 29 (shown in FIG. 7), which can run the length of the drill train 200, from the EB drill 300 to an outlet of the borehole 20. The waste exhaust gas return area 29 can be located between the borehole liner 24 and outer wall of the drill train 200. In an embodiment, the exhaust gas return area can be located, for example, in an access channel in the embodiment of the drill train 200 depicted in FIG. 7. The distal, downstream end of the gas return area 29 can be located at an end of the EB drill 300.

In an embodiment, the particle-laden exhaust gas can be received at the IO flow separator 146 and supplied to the particle separator 150, where the particle-laden exhaust gas can be separated into a nitrogen gas recycle stream and a particle (for example, a ceramic powder) stream. The exhaust gases can be directed through the IO flow separator 146 to the outlet pressure control valve system 140. The nitrogen gas can be recycled in the system and the nano-fine rock particles can be collected for use in applications such as, for example, ultra-high strength concretes and composites.

In an embodiment, the IO flow separator 146 and downstream (or lower) smooth bore pressure vessel 173 can be configured to separate highly pressurized pure nitrogen (and a slightly higher-pressure nitrogen gas with ceramic powder and whiskers in the ceramic infusion channel) flowing down into the borehole 20 from the up-flowing exhaust gas comprising burn gases mixed with nanometer sized particles and vaporized rock from the burn at well bottom. The lower smooth bore pressure vessel 173 and the IO flow separator 146 can be configured to separate and seal these two streams from each other using an internal pressure sealing clamp— namely, (1) the injection stream comprising pressurized nitrogen gas, ancillary materials and whiskers injected into the drill train 200 from (2) the up-flow burn gases mixed with nanometer-sized particles and vaporized rock from the burn at the well bottom. The IO flow separator 146 can operate in conjunction with the multivessel system 194 to separate the streams, as seen in the embodiment depicted in FIG. 4.

The UDW drilling system 10 and borehole 20 can be configured as an adjustable closed system, wherein the purged gas is recycled and reinjected into, and through the multivessel system 194, to borehole 20. In an embodiment, the closed gas system includes the IO flow separator 146, the outlet pressure control valve system 140, the inlet pressure control valve system 148 (shown in FIG. 3), the particle separator 150, the gas generator 120, the gas supply line 122, the gas inlet valves 125, the multivessel system 194, and the borehole 20. The IO flow separator 146 can include, for example, a pipeline manifold.

Figure 11:
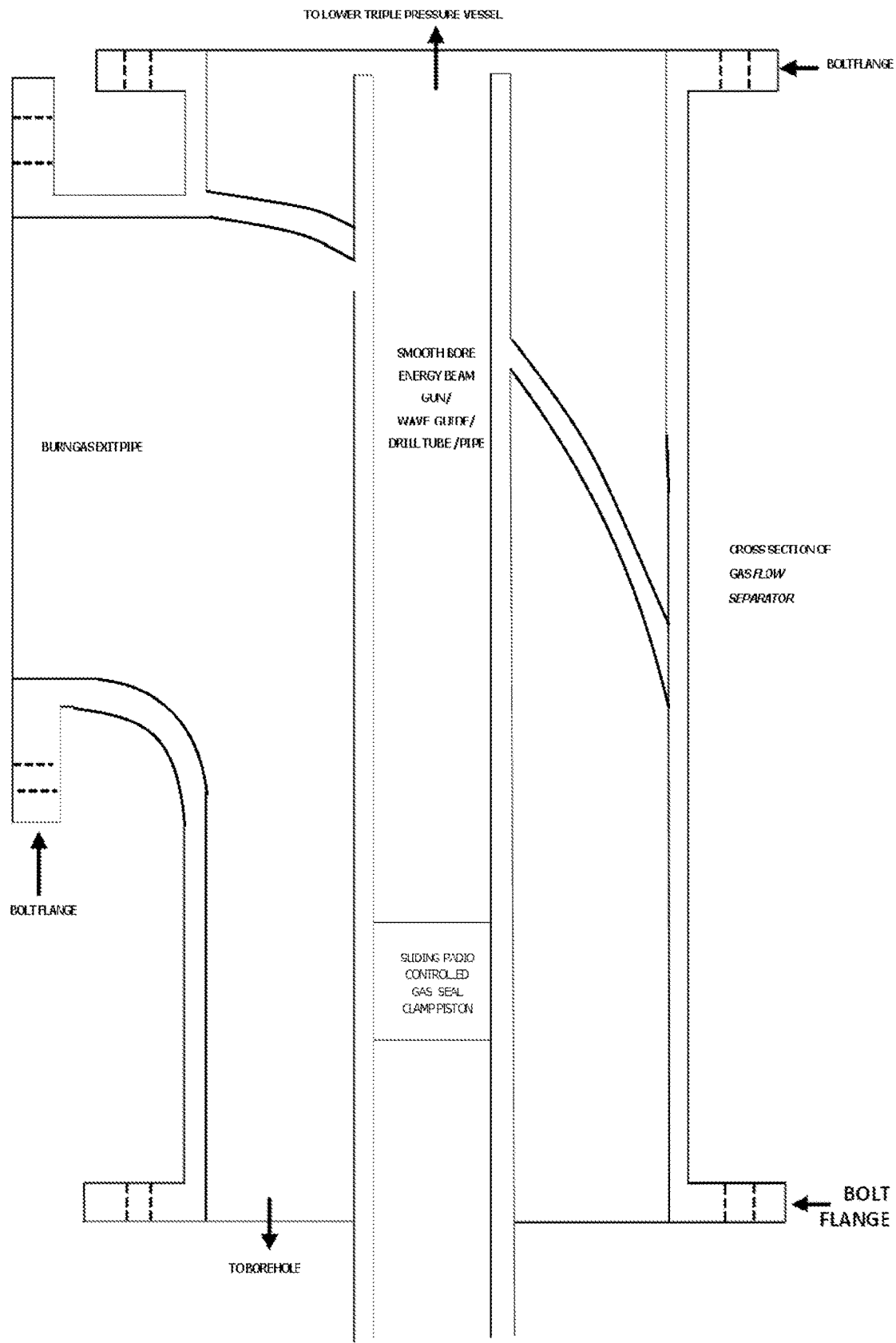
FIG. 11 depicts an embodiment of an inlet-outlet fluid flow separator.

FIG. 11 depicts an embodiment of the IO flow separator 146.

The inlet pressure control valve system 148 (shown in FIG. 3) and the outlet pressure control (or FCPC) valve system 140 can be connected to the controller 400 via communication links. The controller 400 can be configured to monitor and maintain an ultra-pressurized closed system at a predetermined pressure value, or within a predetermined range of values above and below a setpoint pressure. The controller 400 can be configured to adjust the pressure in the closed system, including the borehole 20, by controlling one or more of the components in the inlet pressure control valve system 148. The controller can be configured to adjust or control pressure, for example, via the gas inlet valves 125, the inlet flow control valve 148 and one or more of the components in the outlet pressure control valve system 140 (for example, an outlet flow control valve).

Through control of both the inlet and outlet pressure control valve systems 148, 140, respectively, the controller 400 can maintain a setpoint pressure value (or range of pressure values) for the UDW drilling system 10 and borehole 20 and, while monitoring the real-time closed system pressure, adjust inlet and outlet pressure control valve systems 148, 140, respectively, to increase or decrease the closed system pressure to the setpoint value. In this regard, the controller 400 can also control the gas generator 120 to supply additional pressurized gas, as needed. The controller 400 can be configured to maintain the closed system pressure at or near a predetermined setpoint pressure value to provide ultra-pressurized purge gas that can facilitate the process of removing vaporized rock and melt gasses from the borehole 20, while simultaneously maintaining pressure sufficient to keep the borehole wall casing 24 from cracking or collapsing.

In various embodiments, the controller 400 can be connected, via one or more communication links to various components in the UDW drilling system 10, including the gas generator 120, the compressor 124, the outlet pressure control valve system 140, the inlet pressure control valve system 148, the high-pressure fluid pump 144, the particle separator 150, the gate valves 192, and the multivessel system 194 to control the closed system pressure. The controller 400 can be configured to control operation of the robotic system (not shown) in the multivessel pressure vessel system 194.

In an embodiment, the controller 400 can be configured to control or operate characteristics of all fluid flowing into and out of the borehole 20, including the rate of flow of pressurized purged gas, vaporized matter, and liquid (for example, water). The controller 400 can be configured to control characteristics of all fluid flowing in or out of the borehole 20, including the rate and volume of flow as a function of time, including the rate of flow of vaporized mater (for example, nanoparticles) separated and collected by the particle separator 150.

By adjusting and controlling the rate of flow and pressure of materials, fluids or gases injected into and outlet from the UDW drilling system 10, the controller 400 can adjust and control the overall flow and pressure in the borehole 20. The injected fluid can include ultra-pressurized purge gas and pressurized water. The outlet fluid can include vaporized rock, melt gasses, and the pressured purge gas (for example, nitrogen gas). The term "fluid," as used in this disclosure, means a gas, a liquid, one or more nanoparticles or microparticles (for example, vaporized rock), or any combination of the foregoing.

The controller 400 can be connected, via a communication link, to the AMW injector 130. The controller 400 can be configured to adjust or control the rate at which the AMW injector feeds ancillary material and whiskers into and through the drill train 200 to the EB drill 300. The controller 400 can be configured to control the inlet and outlet fluid flow characteristics of the UDW drilling system 10 such that the ancillary material and whisker can be delivered to the melt zone 22 to form, or facilitate formation, of the borehole wall casing 24 to a predetermined wall thickness or within a predetermined range of wall thicknesses.

The controller 400 can include a sensor system comprising one or more sensors. The controller 400 can include an interface that connects to one or more external sensors. The sensor can include, for example, a pressure sensor, a temperature sensor, a humidity sensor, a gas sensor, a seismometer, or a water sensor.

In an embodiment, the UDW drilling system 10 can include a microwave plasma torch in the EB drill 300 coupled with atomic emission spectroscopy equipment to sample a slipstream of entrained elements leaving the borehole 20 through the IO flow separator 146 to characterize the chemical composition of the rock formation being penetrated to provide real time identification of materials being penetrated for adjusting added ceramic materials in real time based on rock chemistry being encountered thereby forming a stronger borehole liner 24. The UDW drilling system 10 can include a gas chromatograph connected to a slipstream outflow pipe of the IO flow separator 146. The UDW drilling system 10 can include a Fourier transform infrared spectroscopy device (not shown) coupled to a slipstream outflow pipe of the IO flow separator 146 to monitor the presence of gases such as hydrocarbons and hydrogen sulfide.

In various embodiments, the controller 400 can be configured to control the UDW drilling system 10 to increase the purged gas pressure linearly to balance lithostatic pressure exerted on the borehole 20 by the surrounding rock as the EB drill 300 descends into the Earth's crust. The purged gas pressure can be adjusted by the controller to increase as the borehole 20 deepens, by controlling the outlet and inlet pressure control valve systems 140, 148, respectively. The controller 400 can cause the UDW drilling system 10 to adjust and maintain the purge gas pressure to counterbalance lithostatic pressure at depths ranging from just below the Earth's surface to depts of at least twelve miles (12 mi), or deeper.

The controller 400 can be configured to control any process or methodology described herein, including operation of the robotic system (not shown) in the multivessel system 194 in attaching each train section 210 or train connector to the drill train 200 as the drill train is lowered into the borehole 20. The controller 400 can also be configured to control the reverse process or methodology, including detaching each train section 210 or train connector from the drill train 200 as the drill train is raised out of the borehole 20, such as, for example, after completion of the drilling of the borehole 20.

The controller 400 can include one or more computing devices, communicating devices or computing resources. The controller 400 can include any combination of, for example, a central processing unit (CPU), an ARM (Advanced Risk Machines) CPU, a graphic processing unit (GPU), a general-purpose GPU (GPGPU), a field programmable gate array (FGPA), an application-specific integrated circuit (ASIC), a system-on-a-chip (SOC), a single-board computer (SBC), a complex programmable logic device (CPLD), a digital signal processor (DSP), a manycore processor, multiple microprocessors, or any computing device architecture capable of performing the operations described or contemplated herein. The controller (not shown) can include a storage (not shown). The storage can include a read-only-memory (ROM), a random-access-memory (RAM), and a computer-readable medium. In an embodiment, the controller (not shown) includes a processor that can interact with the storage (not shown) to execute computer program code or instructions to perform the processes provided or contemplated by the disclosure.

The particle separator 150 can be configured to separate gases and fine particles (for example, nanoparticles) from the fluid flowing out of the borehole 20. In an embodiment, the particle separator 150 is configured to separate nitrogen gas and fine particles from the fluid flow into a particle output stream that is supplied to the collector 160 and a pressurized gas recycle stream that can be resupplied to the gas generator 120 and the compressor 124 for reintroduction into the UDW drilling system 10 and the borehole 20.

The collector 160 can include a fine mineral collector and/or container such as, for example, a hopper, a trailer, or a container capable of receiving and holding the fine minerals.

The drilling tower 170 can be configured to support the crane 190 and the multivessel pressure vessel system 194 in positional relationship such that the crane 190 can be operated to pick up an individual train section 210 from a nearby location, such as, for example, a delivery truck (not shown) or the ground, and deliver it to the uppermost gate valve 192 in the multivessel system 194. The crane 190 can then position and align the train section 210 with the opening in the multivessel pressure vessel system 194 before lowering the train section 10 into an upstream (or upper) pressure vessel 171 in the multivessel system 194.

The multivessel pressure vessel system 194 can include a plurality of pressure vessels 191, including, for example, two pressure vessels 191 (shown in FIG. 1), three pressure vessels 191 (shown in FIGS. 3, 4), or four or more pressure vessels. The bottommost pressure vessel 173 can be affixed to the vessel-foundation connector using fasteners such as, for example, bolts. The vessel-foundation connector can, in turn, be fastened to the well foundation 180 and/or the well-cap casting 182 by means of fasteners such as, for example, concrete studs.

The vessel-foundation connector can include the flow separator 146, which can be configured to guide the outlet fluid flow from the borehole 20 to the outlet pressure control valve system 140. The inlet pressure control valve 148 can be configured to guide the inlet fluid from, for example, the high-pressure fluid pump 144, into the borehole 20. The flow separator 146 can include a multichannel manifold.

The fluid pump 144 can include an ultra, high-pressure water pump that is adjustable in speed (for example, revolutions-per-minute or RPM), ranging from 0 RPM to a maximum RPM that results in maximum mass flow of supercritical fluid (maximum power) or any intermediate (fully adjustable) power setting for the borehole 20. The fluid pump 144 can be operated, for example, under the instruction of the controller 400, to pressurize and inject the highly-pressurized liquid (for example, water) into the borehole 20, ranging from no flow to a maximum volume of liquid-per-second, or any rate therebetween, thereby controlling the rate at which supercritical fluid flows up a production train (not shown) during geothermal power harnessing.

The drilling tower 170 can be mounted atop of and affixed to the well foundation 180. The well foundation 180 can include a dense, rigid, high-strength material such as, for example, concrete or steel. The well foundation 180 can include a well-cap casting 182 and a metal well seal 184.

The well-cap casting 182 can include a ribbed Hastelloy X or high temperature nickel alloy.

Figure 3:
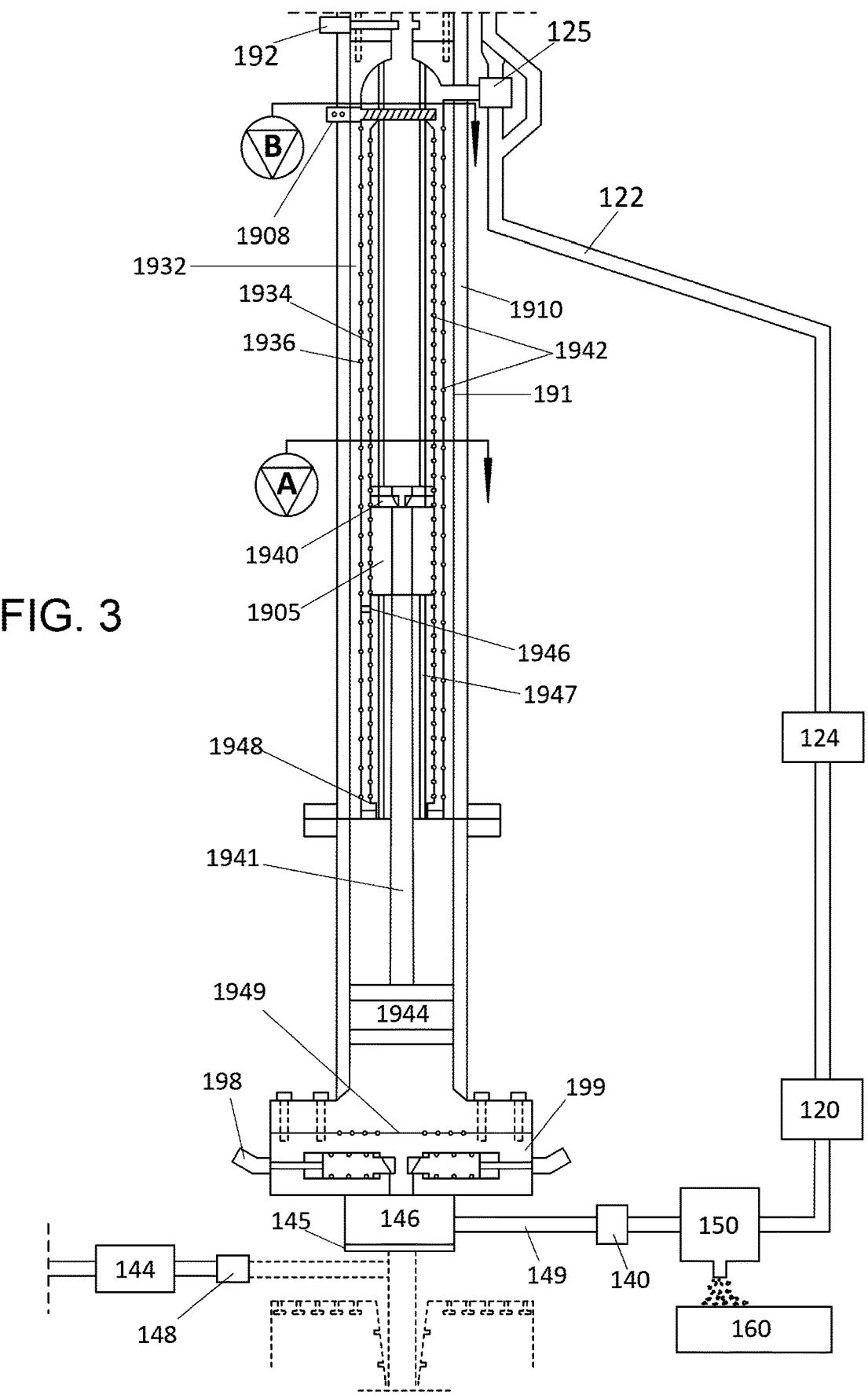
FIG. 3 depicts a partial cross-section view of an embodiment of the UDW drilling system.

FIG. 3 depicts a partial cross-section view of an embodiment of a multivessel pressure vessel system 194 and an embodiment of the IO flow separator 146. The multivessel pressure system 194 includes an upstream pressure vessel 171, a center pressure vessel 172 and a downstream pressure vessel 173. In other embodiments, the multivessel system 194 can include additional pressure vessels (not shown). The downstream (or lowermost) pressure vessel 173 can be connected to a fixed bottom gate valve 192, a fixed hydraulic drill train conical clamping mechanism 193, and the IO flow separator 146. The downstream pressure vessel system 173 can be a smooth bore cylinder with an interior piston with drill pipe connector sealing clamp providing complete separation and ejection of burn gases from the system and be positioned such that its longitudinal axis is aligned with the longitudinal axis of the borehole 20, and the downstream pressure vessel opening is positioned such that the drill train 210 with train connectors can exit the downstream multivessel system 194 and pass through the gate valve 192, clamping mechanism 193, and IO flow separator 146 unobstructed.

In the multivessel pressure vessel system 194 comprising the three pressure vessels 191, at least two of the drilling pressure vessels can each be configured with an internal spiral hydraulic ball screw sled (or elevator) 1905. The multivessel system 194 can include one or more robots (not shown), or the robots can be located external to the multivessel system. Each sled 1905 can be configured to move vertically in relation to the drill tower 170 (shown in FIG. 1). Each sled 1905, including clamping mechanisms, can be operated by, or under the control of, a robot.

In an embodiment, the multivessel system 194 can include a plurality of rotating rod ball screws located near the internal diameter of two or more drilling pressure vessels 191 and connected to the hydraulic ball screw elevators, causing the hydraulic ball screw elevators to ascend or descend.

In certain embodiments, the clamping mechanisms in the multivessel system 194 can be configured to hold at least one of a train section 210, a train connector, and the drill train 200 by means of at least one pair of cone-shaped jaws that include a pressure sealing device imbedded in the pair of cone-shaped jaws. The sealing device can be configured to seal the pair of cone-shaped jaws against, for example, the train section 210, train connector, or drill train 200. The sealing device can include a piston containing piston rings or other sealing mechanisms. The sealing device can be configured to press and/or rotate the train section 210 or train connector together as they are connected to one another, forming a gas seal.

In an embodiment, the clamping mechanisms can include at least one pair of cone-shaped jaws located in the downstream pressure vessel 173 or center pressure vessel 172. The cone jaws can be affixed to the gas separator piston 1944 (shown in FIG. 4) and configured to squeeze and seal on the train section 210 or the train connector, including any one or more of a drill tube, a waveguide, a waste gas extraction tube, a water cooling tube, an electrical supply cable and a ceramic infusion area inside of the vertically moving piston 1944, which can be configured to, at the same time can, seal the exhaust gases rising from a well burn from the drill tube, waveguide and ceramic infusion area incoming gases. In an embodiment, at least one (or all) of the pressure vessels 191 in the multivessel system 191 can be configured to allow the exhaust gases to exit through the gas flow separator 146 and not mix with incoming nitrogen purge gas which travels down the interiors of the drill train 200.

Each hydraulic ball screw sled 1905 can be configured with a plurality of hydraulic conical clamping mechanisms for clamping at least one of the drill train 200, the train connector 212, or the train section 210. In an embodiment, the clamping mechanisms can be configured to separately claim and manipulate each section of the train connector, including, for example, an upstream sub-connector, a downstream sub-connector, any attachment mechanisms (for example, bolts).

In various embodiments, the conical clamping mechanisms can be configured to clamp and maneuver any one or more of a water-cooling system, an electrical supply cable, an AMW feed supply, gas supply, exhaust gas return, or a replaceable burn gas waste tube. The replaceable burn gas waste tube can be configured to have the same length as the drill train 200, but vertically offset in a lower position from the drill train 200 to allow exhaust burn gases to collect under the downstream drilling pressure vessel piston (shown in FIGS. 3, 4) and then exit through the IO flow separator 146 (shown in FIGS. 3, 4).

In various embodiments, the hydraulic ball screw sled (or "elevator") 1905 and the plurality of clamping mechanisms can be configured for retaining the train section 210, the connector or the drill train 200 when lowering the drill train 200 into the borehole 20 at a predetermined speed, according to a type of rock being melted and vaporized, and for maintaining a fixed distance of drill train 200 (and EB drill 300) from the melt area 22 at the borehole bottom, which can be controlled remotely by the controller 400 based on, for example, radar distance measurements.

In an embodiment, the hydraulic ball screw sled 1905 can be configured to control insertion of the waste gas extraction tube, the cooling water tubes, the electric supply cable, the ceramic infusion area in the multivessel system 194.

In embodiment, the multivessel system 194 can include an upstream pressure vessel 171 and a center pressure vessel 172 both comprising machined concentric rings configured internally to accept ball bearings. The upstream and center pressure vessels 171 and 172 can be configured with a plurality of pipes, at least one pipe located internal to each drilling pressure vessel machined on the exterior of the pipe with concentric rings to accept the ball bearings, allowing the pipe to rotate inside the upstream and center drilling pressure vessels 171 and 172. The rotatable pipe can include a lower thrust bearing located at the bottom of each pressure vessel 171 and 172 to handle compressive loads. Each of the plurality of pipes can include a worm gear at the top to be hydraulically or electrically driven to control movement of the hydraulic ball screw sleds 1905 within the two or more pipes. The plurality of pipes configured with internal ball screw threads in a spiral can be configured to permit precise vertical movement of the hydraulic ball screw sleds 1905.

In an embodiment, at least two pipes can each be configured with internal spiral ball bearing grooves to control movement vertically of the traveling hydraulic ball screw sled 1905. The traveling hydraulic ball screw sled 1905 can be configured with external spiral ball bearing grooves. At least two of the plurality of pipes can be configured to be rotatable by the hydraulic motor or electric motor 1908 and a gear set so that when a gear motor is activated, the pipe turns in the clockwise or counter clockwise direction, causing the traveling hydraulic ball screw sled 1905 to descend or to ascend inside at least one of the two or more drilling pressure vessels 171 and 172 providing precise control of the distance between an energy beam gun waveguide or drill tube, exhaust gas extraction tube, cooling water tubes, electric supply cables and ceramic powder infusion area and a burn at the bottom of the borehole.

In an embodiment, the train connector can include upper and lower Hastelloy X, high temperature nickel alloy or carbon fiber ceramic sub-connectors. The sub-connectors can have a conical area that allows the matching conical area of the plurality of clamping mechanisms to engage the sub-connectors and prevent the drill train 200 from falling into the borehole and, at the same time, engaging high-pressure gas seals configured on the sub-connectors while pressing the sub-connectors together. The clamping mechanism can be configured with internal contours that, when fully closed, allow the train section 210 or drill train 200 to pass through, but not the conical portions of the sub-connectors. The upstream and downstream (or upper and lower) sub-connectors can be joined by a ring of Hastelloy X or high temperature nickel alloy bolts or a pipe thread connection that is robotically set and torqued while within the drilling pressure vessels 191. The sub-connectors can include a central energy beam waveguide tube with external radial struts centering a removable waste gas exhaust tube and forming a ceramic powder infusion area and may form channels for the supply of electrical cables, water for cooling and hot water return channels. Struts can be included in the multivessel system 194 and configured to center a drill pipe inside of an exhaust gas extraction tube or a ceramic powder delivery tube area between the train connector and the borehole 20.

In an embodiment, nickel alloy connectors can be used, which can include carbon fiber/ceramic tubes having concentric grooves at each tube connection area to form a strong attachment to the carbon fiber/ceramic train section 210.

In an embodiment, the UDW drilling system 10 can include a remote radar attached to the drill tower 170, and the remote radar can be configured to monitor borehole depth and distance of the at least one section of the drill train 200 or the EB drill 300 from the melt area 22. The radiometer can be configured to monitor and to provide borehole rock temperatures to the controller 400.

At least one of the center drilling pressure vessel 172 and the downstream drilling pressure vessel 173 can include a smooth internal cylinder bore in a pressure vessel tube 1943 and a piston 1944 with pressure sealing piston rings 1945 and a pipe pressure sealing clamp. The pressure vessel tube 1943 can be made of Hastelloy X or nickel-alloy material. The piston 1944 can be connected, by an internal connecting pipe 1941, to the pressure sealing hydraulic clamp mechanism 1940, which can be attached to the sled 1905 in the center pressure vessel 172. The connecting pipe 1941 can include a fixed steel tube. This configuration can cause the piston 1944 to move in the downstream pressure vessel 173 in unison with the sled 1905 in the center pressure vessel 172, thereby allowing the burn gases to be segregated from the incoming nitrogen gas in the drill train 200, for example, in the ceramic powder infusion tube.

In an embodiment of the multivessel system 194 can include a bottom downstream vessel 173 connected or bolted to the lower end of an adjacent vessel 172 to provide a continuation of the same internal diameter of the pressure vessels, but configured with a smooth cylinder bore, instead of, for example, a ball bearing race. In an embodiment, upper, upstream drilling pressure vessels 171 can be configured with a ball bearing race. The bottommost, downstream drilling pressure vessel 173 can have a smooth cylinder bore equipped with a piston 1944 with gas sealing piston rings 1945 and a pressure sealing vice clamp, which can be attached to the elevator of the adjacent drilling pressure vessel by a connecting pipe, as seen, for example, in FIG. 4. The piston 1944 can seal the upcoming drilling burn gases from the incoming nitrogen purge gas. The piston 1944 can have a vertical center hole in it which allows a train section 210 to pass through it, providing a continuous feed mechanism for these units proceeding down into the well bore. A second pressure seal can be provided by a hydraulic vice clamp located on the bottom of the bottommost pressure vessel piston sealing against piston rings located on the train section 210 or train connector. This arrangement can provide a continuous feed of the drill train 200 into or out of the well bore while maintaining very high continuous gas pressure in the wellbore to resist lithostatic and hydrostatic pressures in the lower borehole, allowing drilling to depths never before achieved without this system.

The downstream pressure vessel 173 can be affixed to or include the IO flow separator 146. The IO flow separator 146 can include a fixed hydraulic conical clamping mechanism 1461, a fixed hydraulic drill train conical clamping mechanism 1462, and a gas flow separator 146. The clamping mechanism 1461 can be located between the bottom of the downstream pressure vessel 173 and the gas flow separator 146.

In an embodiment, the IO flow separator 146 can comprise a high temperature metal or carbon fiber ceramic material. The IO flow separator 146 can be securely attached to the well-cap casting 182 and/or the metal well seal 184. The IO flow separator 146 can be configured to direct the burn gases through the outlet flow control valve system 140, which can include a well gas pressure and flow regulator valve, working in unison with the inlet pressure control valve system 148, which can include an input pressure and flow control valve at the top of the borehole 20 to precisely control borehole pressure and gas flow rate in the entire borehole 20. In an embodiment, the outlet and inlet flow control valve systems 140, 148 can be located below the IO flow separator 146 such that, when the IO flow separator 146 is removed, the valve systems 140, 148, remain in place and can be used in the geothermal harnessing phase, after the well bore is completed and the drill train 200 replaced with a production train (not shown).

In an embodiment, the drill train 200 includes a nitrogen pressurized channel with a second channel surrounding it and transporting the burn gases and nitrogen gas up to the IO flow separator 146 and then exiting through, for example, the particle separator 150, which can include a wet process particulate filter. At the same time, the ancillary materials (for example, ceramic powder) and whiskers (for example, ceramic whiskers) can be transported down the drill train 20 to the circumference of the melt area 22 operating under slightly higher nitrogen gas pressure and forming the borehole wall casing 24, comprising a form of silicon nitride, aluminum nitride or similar ceramic borehole liner.

At the Earth drilling end of the drill train 200, the EB drill 300 can include an energy beam drill, a plasma-arc infrared beam drill, a laser guided plasma beam drill or a direct electrical discharge energy drill, any of which can be water cooled and attached to the drill train 200 and lowered into the borehole 20 as drilling progresses.

In an alternative embodiment, the EB drill 300 can be attached internally in the upstream drilling pressure vessel 171. The plasma-arc infrared EB drill 300 can include an extendable waveguide that is robotically attachable to the drill train 200 using the plurality of clamping mechanisms in the multivessel system 194 for progressively drilling a borehole by transmitting a directed energy beam through the waveguide to vaporize rock in a geological formation as the drill train 200 descends through a geological formation forming a ceramic borehole wall casing 24 at the circumference of the borehole 20, while maintaining a predetermined fixed distance between the bottom of the drill train 200 or energy beam gun and the melt created at the bottom of the borehole 200. In various embodiments, the drill train 200 can include at least one waveguide, at least one waste gas exhaust tube, at least one ceramic powder infusion tube with a cooling water system, and a ceramically insulated electrical supply cable.

In an embodiment, the supercritical fluid, which is produced in the lower regions of the borehole 20, can have a temperature from about 720° F. to about 1300° F. Each train section 210 and train connector of the drill train 200 can be configured to be super-insulated, for example, by including a super insulating graphene material, as in the embodiments depicted in FIG. 7. The supercritical fluid can include, for example, water or carbon dioxide at supercritical temperatures and pressures.

As seen in the cross-section cut view of the embodiment of the multivessel system 194 depicted in FIG. 3, the downstream pressure vessel 173 can include a vessel housing 1910 having a drill train channel 1912. In an embodiment, the entire multivessel system 194 can be placed in the vessel housing 1910, which can be formed, for example, by a carbon-fiber or carbon-fiber ceramic wrapping. In another embodiment, each pressure vessel 171-172-173 of the multiverse system 194 can be placed in its own vessel housing 1910. A gate valve 192 can be positioned at each end of each pressure vessel 191, including, for example, at the upper (or lower) end of the upstream pressure vessel 171, the upper (or lower) end of the center pressure vessel 172, or the upper (or lower) end of the downstream pressure vessel 173 and arranged to hermetically seal one or more of the pressure vessels 171-172-173 individually or together with another pressure vessel 171-172-173 in the multivessel system 194.

The vessel housing 1910 can comprise nickel alloy or a ceramic/carbon fiber material. In an embodiment, the nickel alloy vessel housing 1910 can be wrapped with carbon fiber/ceramic around each pressure vessel in the multivessel system 194. In an alternative embodiment, each pressure vessel and/or the entire multivessel system 194 can be constructed with the vessel housing 1910 being wrapped in carbon fiber/ceramic providing an outer layer of the multivessel system 194.

Any one or more of the pressure vessels in the multivessel system 194 can include a hydraulic or electric worm gear motor 1908, which can be configured to drive the internal hydraulic ball screw clamping sled 1905 upward or downward in the drill train channel 1912. The motor 1908 can be controlled by, or under the operation of, the controller 400.

In various embodiments, the multivessel system 194 can include any combination of a hydraulic worm gear drive 1930 (shown in FIG. 4), a worm gear-powered rotating sleeve 1931 (shown in FIG. 5), screw ball bearing rings (descending or ascending) 1932 (shown in FIG. 3), a spiral ball race 1934 (shown FIGS. 3, 5), a hydraulic driven rotating spiral grooved tube 1935 (shown in FIG. 3), flat ball bearing rings 1936 (shown in FIGS. 3, 6), a flat ball bearing race 1937 (shown in FIG. 6), a spiral ball bearing grooved Hastelloy X pressure vessel tube 1938 (shown in FIG. 3), a worm gear ring 1939 (shown in FIG. 6), a pressure vessel clamp 1940 (shown in FIGS. 3-5), a connecting pipe 1941 (shown in FIG. 4), ball bearings 1942 (shown in FIG. 3), a smooth bore Hastelloy X pressure vessel tube 1943 (shown in FIG. 4), gas flow piston 1944 with tapered drill tube clamp with gas flow piston rings 1945 (shown in FIG. 4), a screw plug (to install roller bearings) 1946 (shown in FIG. 3), anti-rotational slide bars 1947 (shown in FIGS. 3, 5), Rotec thrust bearing 1948 (show in FIGS. 3-4), and O-ring seals 1949 (shown in FIG. 3).

As seen in the embodiment depicted in FIG. 1, the multivessel pressure vessel system 194 can be located above ground in the drilling tower 170. Each pressure vessel 191 in the multivessel system 194, as well as the drill train 200, including all train connectors, can be configured to maintain a constant high pressure as additional train sections 210 are added to the drill train 200. As noted above, any of the pressure vessels in the multivessel system 194 can be configured to be pressurized or depressurized independently of any other pressure vessel by, for example, operation of the one or more high-pressure gate valves 192 attached to the pressure vessels.

Figure 4:
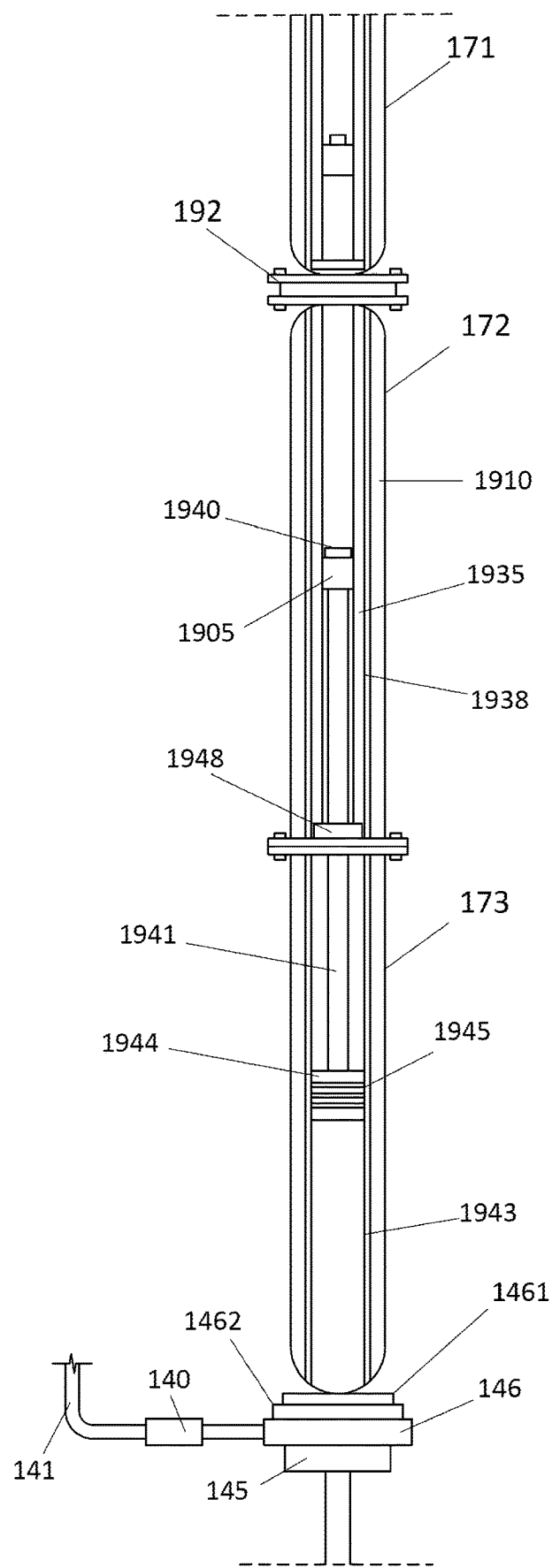
FIG. 4 depicts a partial cross-section of an embodiment of a multivessel vessel system and a fluid flow separator.

For instance, in the embodiments depicted in FIGS. 1, 3 and 4, the upstream pressure vessel 171 can be depressurized and two new 26.5-foot or one 53-foot train section 210 can be inserted. Then, the upstream gate valve 192 on the upstream end of the upstream pressure vessel 171 can be closed. The gate valve 195 between the upstream vessel 171 and the center vessel 172 can be opened, pressurizing both pressure vessels. As discussed above, each pressure vessel can be equipped with an internal mechanism that can be operated with hydraulic ball screws to raise and lower the hydraulic sled (or elevator) 1905 with the pipe clamping system 1940, such that the drill train 200 can be controllably moved or maintained at a precise speed in the borehole 20 to, for example, maintain a constant temperature and distance of the energy beam at the EB drill 300 from the melt zone 22 at the borehole bottom as it proceeds down vaporizing the rock.

Referring to FIG. 4, when the sled 1905 is at the bottom of its stroke in the pressure vessel 172, the power can be turned off and the downstream pressure vessel 173 will maintain the pressure along with the entire borehole 20. Then, the gate valve 192 between the upstream pressure vessel 171 and the middle pressure vessel 172 can be closed and the upper gate valve 192 on the upstream pressure vessel 171 can be opened, depressurizing the upper pressure vessel 171 to add another train section 210, while the downstream pressure vessel 173 remains closed and in pressure equilibrium with the borehole 20. Once the entirety of the train section 210 is in the upstream pressure vessel 171, the uppermost gate valve 192 can be closed and all of the pressure vessels pressurized. The train section 210 can be connected to the drill train 200, and the electrical, gas and ancillary material and whisker (AMW) connections can be made. The entire process can be handled autonomously by the controller 400 and the robotic system, repeating the process for each train section 210 as the EB drill 300 vaporizes the rock at the bottom of the borehole 20.

FIG. 3 depicts a partial vertical cross-section cut view of an embodiment of the UDW drilling system 10 provided with a triple-vessel system 194. Components in the embodiments of the triple-vessel system 194 depicted in FIGS. 3 and 4 can be interchangeable. As seen in the embodiment depicted in FIG. 3, the downstream pressure vessel 173 of the triple-pressure vessel system can include a vessel base 1914. The vessel base 1914 can include a base pressure casting. The vessel base 1914 can include a hydraulic clamp motor 198. The downstream pressure vessel 173 can include the gate valve 192 positioned at the upper end of the pressure vessel and arranged to hermetically seal the downstream pressure vessel 173 with the borehole 20. The vessel base 1914 can be affixed to the IO flow separator 146.

In an embodiment, a second gate valve 192 can be included and positioned at the bottom end of the downstream pressure vessel 173. The second gate valve 192 can be affixed to, or incorporated into, the vessel base 1914.

The vessel base 1914 can be attached to, or it can be formed as part of, the vessel-foundation connector. In an embodiment, the vessel base 1914 is bolted to the vessel-foundation connector, which in turn is fixedly attached to the well foundation 180.

In various embodiments, each pressure vessel in the multivessel pressure vessel system 194 can have a similar or substantially the same structure, or any one or more of the pressure vessels can be structured or configured different from the other pressure vessel(s) 191 in the multivessel system 194.

Figure 5:
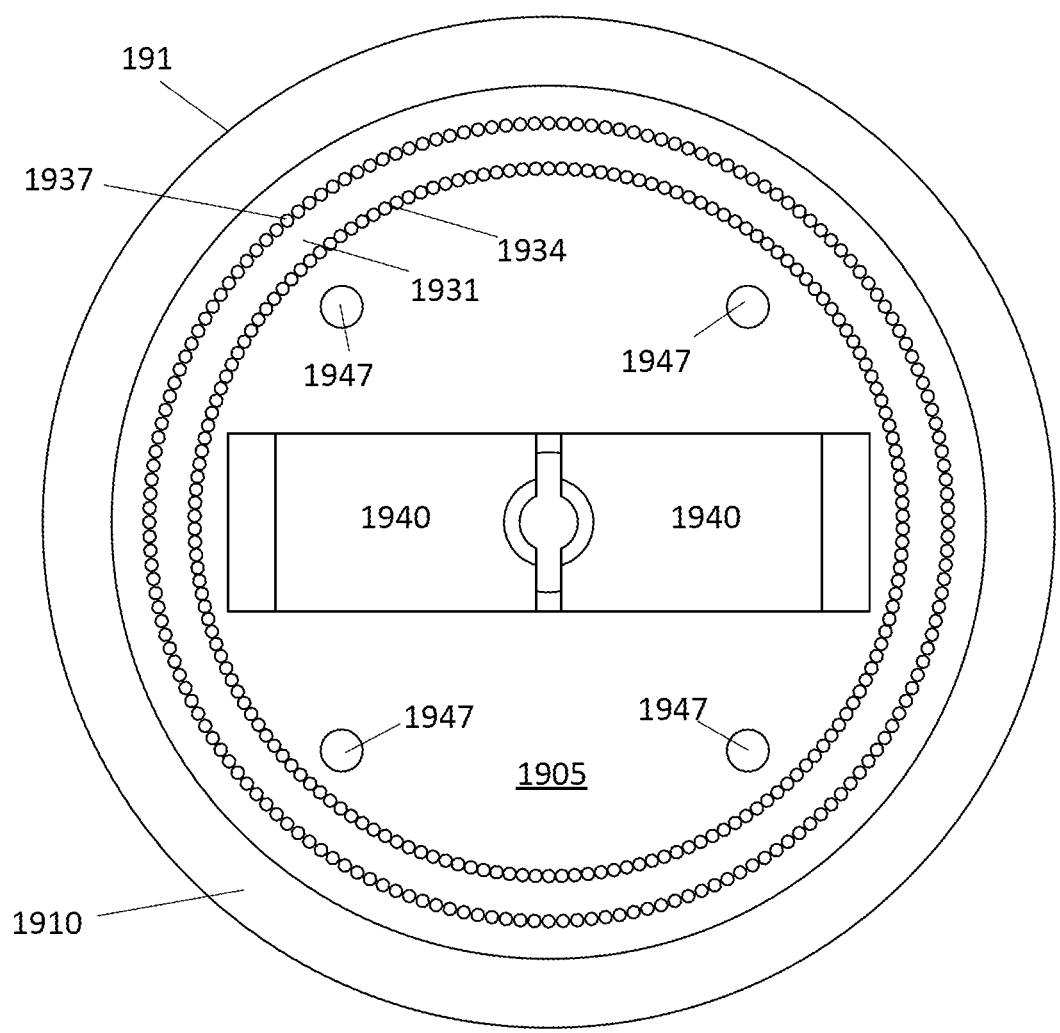
FIG. 5 depicts a cross-cut view of the embodiment of a pressure vessel depicted in FIG. 3 cut along a first line.
Figure 6:
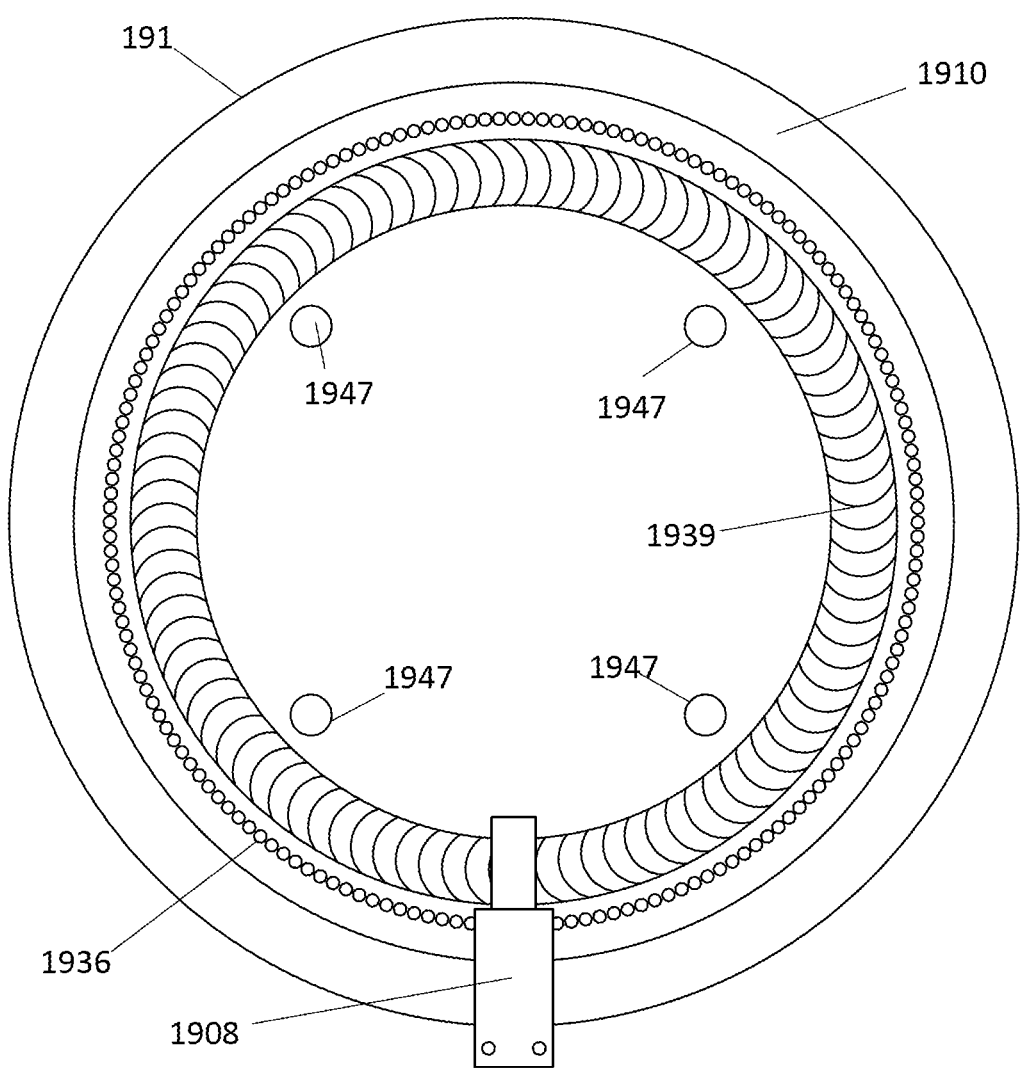
FIG. 6 depicts a cross-cut view of the same embodiment of the pressure vessel depicted in FIG. 3 cut along a second line, upstream of the first line.

FIG. 5 shows a cross-cut view of the embodiment of the pressure vessel 172 depicted in FIG. 3 cut along the line B (shown in FIG. 3) to show a top view of the internal hydraulic ball screw clamping sled 1905; and, FIG. 6 shows a cross-cut view of the same pressure vessel 173 cut along the line A (shown in FIG. 3). As seen in FIG. 5, the clamping sled 1905 can include a plurality of anti-rotational slide bars 1947, each of which can be configured to counteract any rotational forces applied to the clamping sled 1905 to keep the clamping sled from rotating with respect to the vertical axis (for example, the longitudinal axis of the borehole 20). The clamping sled 1905 and/or clamping mechanism(s) 1940 can be coupled to the worm gear, a ball screw elevator or other drive mechanism, which can be driven by the motor 1908 to move the clamping sled 1905 up/down in the pressure vessel 194. The anti-rotational slide bars 1947 can guide the clamping sled 1905 as it travels up/down along the internal height of the pressure vessel in tow with the train section 210 or the drill train 200.

Referring to FIG. 6, as the motor 1908 engages and drives the worm gear ring 1939, the worm gear 1930 turns and drives the rotating sleeve 1931 and/or clamping sled 1905 upward or downward in the pressure vessel 191, along the longitudinal axis of the multivessel system 194.

Referring back to FIG. 3, the multivessel system 194 includes an upstream opening at a top end of the upstream pressure vessel that provides access to the drill train channel 1912, allowing the train section 210 to pass through the opening into the channel 1912 unobstructed. The upstream opening can be aligned with and positioned such that the channel 1912 can be accessed through the gate valve 192, allowing the train section 210 to pass through the opening and gate valve 192 unobstructed. The upstream opening can be configured to allow the drill train 200, including train section connectors to pass through unobstructed.

In various embodiments, a gate valve 192 can be positioned at each end of each pressure vessel 191 to hermetically seal the pressure vessel from an adjoining pressure vessel, the borehole 20, or the surrounding atmosphere. In various embodiments, one or more pressure vessels 171-172-173 and/or gate valves 192 can be added the multivessel pressure vessel system 194. Each gate valve 192, individually or in combination with one or more other gate valves 192, can be configured to seal and adjust or maintain a predetermined pressure inside each pressure vessel, independent from the other pressure vessel(s) 171-172-173, the borehole 20 or the surrounding atmosphere.

In the embodiment depicted in FIG. 3, the outlet pressure control valve system 140 can include the well bore outlet (or exit) flow control valve 143 and/or the outlet shutoff valve 145. The inlet pressure control valve system 148 can include the purge gas inlet valve 125 and an inlet flow control valve. The inlet pressure control valve 148 can include an inlet shutoff valve (not shown) and a drill tube pressure reduction control valve.

Each pressure vessel can include a gas inlet valve 125, each of which can be connected between the respective pressure vessels (as seen in FIG. 3) and the purge gas supply line 122 to inject ultra-pressurized gas into the pressure vessels. The gas inlet valve 125 can be located downstream of the gate valve 192. The controller 400 can be configured to close the gate valve 192 before opening the gas inlet valve 125 to inject pressurized gas into the pressure vessel, to avoid releasing the pressurized gas into the surrounding environment. Similarly, the controller 400 can be configured to close the gas inlet valve 125 before opening the upstream gate valve 192.

In an embodiment, the train connector can include a plurality of sub-connectors that can be installed between adjacent train sections 210 to form the drill train 200. The train connector can include a material such as Hastelloy X or nickel-alloy. The train connector can include an upstream sub-connector and a downstream sub-connector, which can be attached to each other, the train section 210 or the drill train 200. The sub-connectors can be attached using, for example, bolts or threaded-coupling.

The train connector can be configured to be assembled in the multivessel system 194 (shown in FIGS. 1, 3, 4). In an embodiment, the downstream sub-connector can be affixed, by the robotic system (not shown), to the top of the drill train 200 in one of the pressure vessels in the multivessel system 194. At the same (or a different) time, the upstream sub-connector can be affixed, by the robotic system, to the bottom of the incoming train section 210 that is to be coupled to the drill train 200. In embodiments, the drill train 200 can be either stationary or moving while the sub-connectors are secured to the train section 210, each other, or the drill train 200.

The downstream sub-connector can have a cylindrical shape with a grooved section at the downstream end. The grooved section can be carbon fiber bonded at the carbon fiber bonding area to the carbon fiber ceramic shell at the top of the drill train 200.

The upstream sub-connector can have the same shape as the downstream sub-connector (for example, cylindrical shape) with a grooved section at the upstream end. On the opposite, downstream end, the sub-connector can comprise the engagement member. The engagement member can include a lip. The grooved section can be carbon fiber bonded at a carbon fiber bonding area to a carbon fiber ceramic shell of the train section 210.

Each of the sub-connectors can include an electroplated Hastelloy X or nickel-alloy wave guide tube, a connector housing, and a graphene super insulation sandwiched between the tube and the housing. The tube can include, for example, a gold electroplating, a silver electroplating, or a copper electroplating. The connector housing can include Hastelloy X or other nickel-alloy.

In an embodiment, the train section, sub-connectors, and drill train 200 can be, for example, wrapped in super insulating graphene with a protective layer of nickel alloy foil and then thermally sprayed nickel alloy, which can be added under a nitrogen blanket providing a high temperature nickel alloy protective coating during manufacture.

FIG. 7 depicts a cross-section cut view of an embodiment of the drill train 200. The drill train 200 can have any number of channels, channel configurations, channel sizes or channel shapes. The drill train 200 can include a plurality of tiered networks of channels (or tubes or chambers), including an inner tier 220 of a network of channels, a middle tier 230 of a network of channels, and an outer tier 240 of a network of channels.

The inner network tier 220 can include a plurality of access channels, including one or more electrical cable channels 222, one or more plasma gas channels 224, and one or more electrode feed channels 226, each of which can be separated from any other channel in the network of channels. The inner network tier 220 can include fewer, or more, than the number of access channels shown in the embodiment depicted in FIG. 1. The electrical cable channel 222 and the electrode feed channel 226 can supply power and electrode material to the energy beam gun. The plasma gas channel 224 can supply a burn gas and/or a shield gas.

The inner network tier 220 can be connected to the outer radial wall 235 of the middle network tier 230 by a plurality of cross members 225. In an embodiment, the plurality of cross members 225 create a plurality of access channels 232, 234, 236, 238 that form the middle network tier 230. The cross members 225 can be plug welded to the radial wall 235. The cross members 225 can be plug welded and/or integrally formed with the channel walls in the inner network tier 220.

The middle network tier 230 can include, for example, a cooling water supply channel 232, a nitrogen purge gas supply channel 234, a hot water or steam return channel 236, and a nitrogen purge gas supply channel 238. In various embodiments, the middle network tier 230 can include additional access channels.

The middle network tier 230 and the outer network tier 240 can be separated by a plurality of cross members 245, which can be plug welded between the radial wall 235 of the middle network tier 230 and an outer radial wall 250 of the outer network tier 240. The cross members 245 can create a plurality of access channels 242 that form the outer network tier 240. One or more of the plurality of accesses channels 242 can include an ancillary material and whisker (AMW) supply channel. In an alternative embodiment the entire network may be extruded from carbon fiber/ceramic composite. The outer radial wall 250 can include a high-temperature nickel alloy. The outer wall 250 can include, or it can be wrapped in, a material 252 comprising a carbon fiber ceramic material.

The area between the surface of the borehole wall casing 24 of the borehole 20 and the outer radial wall 250 of the drill train 200 can comprise the burn gas return area 29. The area between the burn gas return area 29 and the ceramic powder and whisker supply area 242 can comprise the exhaust burn gas water cooling channel 299.

When the borehole 20 well is at maximum depth, the drill train 200 can be extracted using the same method as for installation, keeping high pressure in the borehole 20 at all times.

FIG. 8 depicts an embodiment of a manufacturing process 400A for making waving guide tubes. The process 400A can be implemented to manufacture a train section 210, a train connector, or for connecting adjacent train sections 210, with or without a connecting train connector. The process 400A can be performed under the control, and as a result of operation, of the controller 400. The process 400A can be carried out under control of the controller 400, which is configured to read and execute sections of code or computer-readable instructions from a non-transitory computer-readable medium. In an embodiment, the controller 400 can be configured to execute computer-readable instructions to perform the process 400A, comprising: cutting one or more lengths of Hastelloy X or other high temperature, high strength nickel alloy tube (for example, three-foot to four-foot long sections) (at Step 405); machining small concentric grooves internally in the tube (at Step 410), wherein the distance between the grooves and width and depth of these grooves can be determined by, for example, the wavelength or other properties of the electromagnetic waves that are to be transmitted by the tube; electroplating the interior of the tube with gold, silver, copper or another material that can effectively transmit the electromagnetic energy (at Step 415); assembling the tubes on a mandrel (at Step 420); welding (for example, laser weld or TIG weld) the tubes together along with their end connectors (at Step 425); scoring or roughening the exterior of the tube to increase bonding to a carbon fiber windings (at Step 430). The process 400A can include wrapping the tube with carbon fiber (at Step 435). The process can include coating the tube with a ceramic binder (at Step 440). The process can include autoclaving the tube under pressure (for example, in a vacuum bag) at, for example, about 190° F. to set the phenolic resin or ceramic binder (at Step 445). The process can include removing the guide from the autoclave and then removing it from the mandrel (at Step 450). The process can include firing the guide in an electric furnace under a nitrogen atmosphere of, for example, about 1500° F. or more until all off gassing has occurred and the guides are carbonized, resulting in a ceramic waveguide (at Step 455). The process can include cooling the waveguides and readying them for storage or transport (at Step 460).

FIG. 9 depicts an embodiment of a manufacturing process 400B for manufacturing energy beam drilling tubes. The process 400B can be implemented for manufacturing the train section 210 or the train connector. The process 400B can be carried out under control of the controller 400 reading and executing sections of code or computer-readable instructions from a non-transitory computer-readable medium, including: winding carbon fiber on a mandrel and soaking it in a ceramic binder (at Step 408); autoclaving the structure under pressure in a pressure unit, in a vacuum bag or in a vacuum or nitrogen atmospheric autoclave at 190° F. to set the ceramic or phenolic resin binder (at Step 413); removing the structure from the autoclave pressure unit and from the mandrel (at Step 418); firing the unit in an electric atmospheric furnace under a nitrogen atmosphere pressure at 1500° F., or more, until substantially all off gassing has occurred and the unit is carbonized, resulting in a ceramic well pressure vessel (at Step 423). The process can include cooling the unit and readying it for storage or transport (at Step 428).

In various embodiments, the processes 400A or 400B can be carried out manually.

Figure 10:
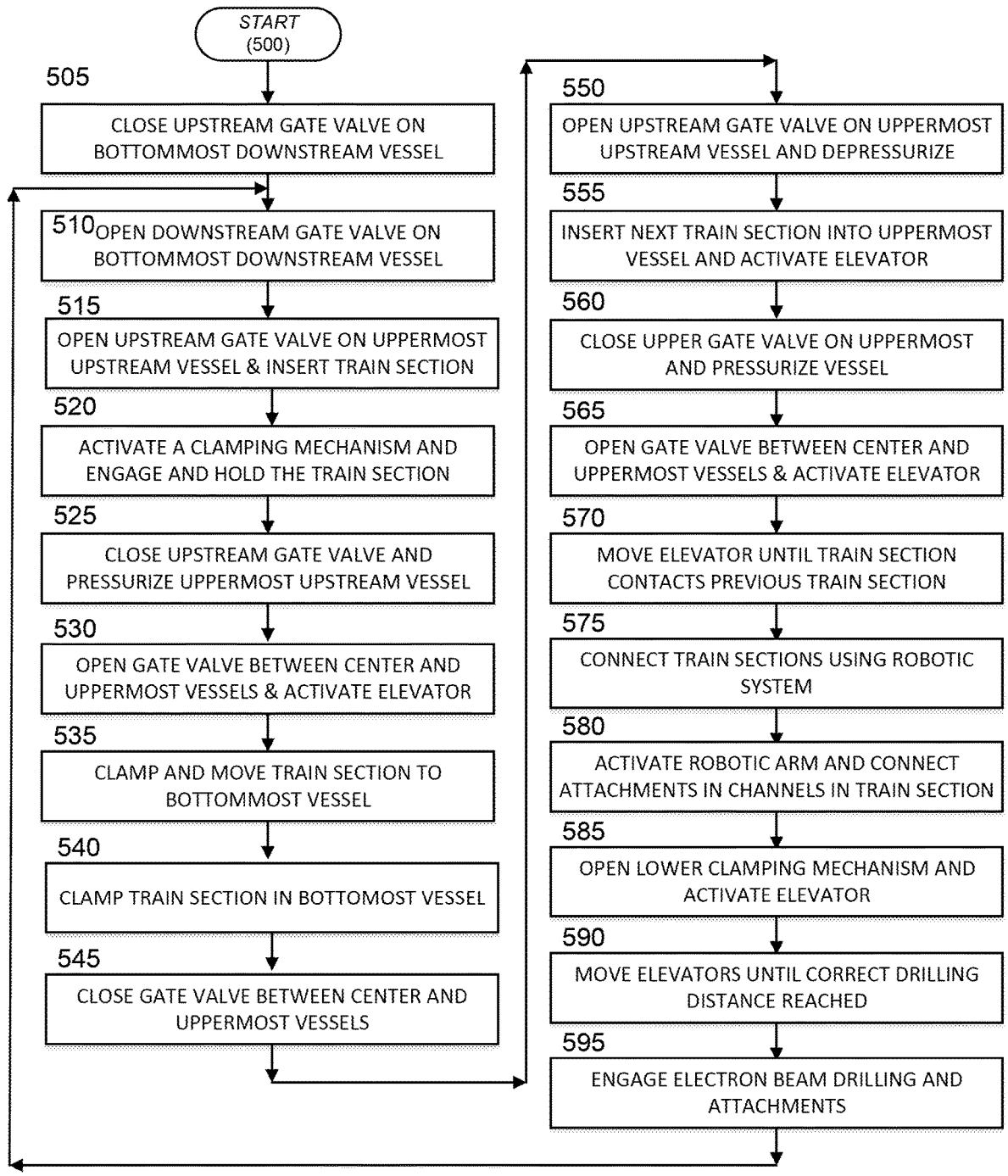
FIG. 10 depicts an embodiment of a process for drilling an ultra-deep borehole by the UDW drilling system.

FIG. 10 depicts an embodiment of a method for drilling one or more boreholes by the UDW drilling system 10, according to the principles of the disclosure. The method 500 can be performed by the UDW drilling system 10 operating under control of the controller 400. The method 500 can include any combination of one or more of the following steps.

Referring to FIGS. 1, 3, 4, and 10, initially, the borehole 20 can be pressurized by closing (or keeping closed) the gate valve 192 at the upstream end of the bottommost downstream pressure vessel 173 (Step 505) and opening the gate valve 192 at the bottom of vessel 173 (Step 510) to pressurize the borehole 20, while keeping borehole 20 fully pressurized at all times with nitrogen or other gas. At Step 510, a bottom hydraulic drill train vice clamp, which can be provided in or affixed to the vessel-foundation connector, can be set to an open position. At Step 510, the gas inlet valve 125 can be opened to inject pressurized gas into the downstream pressure vessel 173. In an embodiment, the vice clamp can be attached to the drill tower 170 and does not move vertically.

Once the bottommost downstream vessel 173 has been sealed from the center vessel 172, the upper gate valve 192 on the uppermost upstream vessel 191 can be opened and a train section 210 inserted into the upstream pressure vessel 171 (Step 515). One of the plurality of clamping mechanisms can be activated to hold the train section 210 in the uppermost upstream pressure vessel 171 (Step 520). The train section 210 can be inserted into upstream pressure vessel 171 using the crane 190.

After the train section 210 is inserted downstream, past the uppermost gate valve, the upstream gate valve on the uppermost upstream vessel 171 can be closed and the gas inlet valve 125 opened to pressurize the pressure vessel (Step 525). The upstream vessel 171 can be pressurized to a pressure equal to the pressure in the center vessel 172 and/or bottommost downstream vessel 173. The gate valve 192 located between the center drilling pressure vessel 172 and the upstream drilling pressure vessel 171 can be opened and movement of one of the hydraulic ball screw elevators 1905 can be activated (Step 530). The clamp on the elevator can be operated to clamp and lower the train section 210 into the bottommost downstream pressure vessel 173 (Step 535).

In the bottommost downstream vessel 173, the train section 210 can be clamped with the hydraulic ball screw pressure sealing clamp in the pressure vessel (Step 540) and the gate valve between the center and uppermost upstream pressure vessels can be closed (Step 545). The upper gate valve 192 on the uppermost vessel 171 can be opened and the vessel depressurized to receive the next or second train section 210 (Step 550).

As, or after, the next train section 210 is inserted into the upstream vessel 171, movement of one of the hydraulic ball screw elevators 1905 in the upstream drilling pressure vessel 171 can be activated and the second train section clamped (Step 555). The gate valve 192 at the upstream end of the uppermost vessel can be closed and the vessel pressurized, including, for example, opening the gas inlet valve 125 to inject pressurized gas (Step 560). The gate valve between the middle drilling pressure vessel 172 and the upper drilling pressure vessel 171 can be opened and downward movement of one of the hydraulic ball screw elevators 1905 activated in the uppermost drilling pressure vessel 171 (Step 565) and moved until the clamped train section 210 makes contact with the clamped train section 210 (or dill train 200) held by the hydraulic ball screw elevator 1905 in the downstream drilling pressure vessel 172 (Step 570), with the train sections 210 (or train section 210 and drill train 200) being held in alignment with each other.

With the train sections in alignment, a robotic system can be activated to connect the train sections 210, for example, with the train connector or with pipe threads at the connecting ends, thereby joining the units (Step 575). In an embodiment, the robotic system can include, for example, bolt insertion and torque wrench arm or a rotary drill tube screw unit. The robotic system can include one or more robotic arms in the upstream pressure vessel 171 containing, for example, an electric power cable, a nitrogen gas supply, a nitrogen gas supply mixed with ceramic powders and whiskers, an energy beam drill, a cooling water supply and a return and the exhaust gas extraction tube, any combination of which can be attachable to an extendable tube system which can then be connected to the train section 210.

The robotic arm in the upstream drilling pressure vessel 171 can be operated and the attachable electric power cable, the nitrogen gas supply, the nitrogen gas supply mixed with ceramic powders and whiskers, the energy beam drill, the cooling water supply and return and the exhaust gas extraction tube, can be attached to and connected in the train section 210 (Step 580). The lower clamping mechanisms can be opened and downward movement of the upper hydraulic ball screw elevators activated (Step 585). The elevators can be moved downwardly until the correct distance is attained from the rock in the borehole, at which point power can be supplied to the EB drill 300, as well as the nitrogen gas supply, the ceramic powder and whisker supply, the cooling water supply, and the return (Step 590). The hydraulic ball screw system can then slowly lower the drill train 200 with the accuracy of a CNC machine tool maintaining a fixed distance from the melt at the bottom of the borehole, drilling the borehole (Step 595). Steps 510 through 595 can be repeated until the desired borehole depth is achieved.

The method 500 can be reversed, while keeping constant pressure in the borehole, until the entire drill train 200 is removed from the borehole 20.

In various embodiments, one or more of the steps in the method 500 can be omitted, rearranged or additional steps added.

In an alternative embodiment, male and female threads can be formed on the training sections 210 during manufacturing and the train sections can be, instead, robotically screwed together.

In an embodiment, the method can include the following Steps 601-617, including: setting the downstream drilling pressure vessel 173 with the bottom gate valve 192 open and middle drilling pressure vessel 172 with the top gate valve 192 closed (Step 601), while always maintaining the borehole 20 fully pressurized with nitrogen gas. In this step, the bottom hydraulic drill pipe/waveguide vice clamp, which is attached to the drill tower and does not move vertically, can be set to the open position.

At Step 602, the top gate valve 192 of the upper pressure vessel 171 can be opened and the top pressure vessel 171 can be depressurized, while the upper gate valve remains open.

At Step 603, two new train sections 210 (for example, 26½ foot long) or a single train section 210 (for example, 53-foot long) can be inserted in the upper vessel 171 by the crane 190.

At Step 604, the hydraulic train section vice clamp attached to the upper pressure vessel hydraulic ball screw elevator can be closed on the train section (and/or train connector 212) at the top of the uppermost train section 210, suspending the drill train 200 above the borehole 20, while the energy beam and ceramic powder supply, burn gas waste exhaust tube, electrical connection and nitrogen gas supply are robotically coupled to the uppermost train section 210, and the upper gate valve is then closed.

At Step 605, the gate valve 192 between the upper and middle pressure vessels 171-172 is opened and all pressure vessels are pressurized.

At Step 606, the drill train 200 is lowered by the upper vessel ball screw elevator until a correct distance is attained to close the hydraulic conical sealing mechanism in the gas flow separator piston in the lower drilling pressure vessel 173 to affect a seal between the incoming nitrogen gas and the burn gases, the clamping mechanism on the middle pressure vessel can then be closed on the second train section 210 (or train connector) and the entire drill train 200 can then be lowered by the hydraulic elevator until the correct distance is attained from the borehole bottom to begin a burn. At that point, the EB drill 300 and the ceramic powder flow can be engaged and the hydraulic ball screw elevator system can begin to slowly lower the assembly with the accuracy of a CNC machine tool maintaining a fixed distance from the melt at the bottom of the borehole.

At Step 607, the burn can be continued until the train connector between the first and second train sections 210 seats in the bottom vice clamp, then the clamp can be closed, suspending the drill train 200. At this step, power and the material flow can be stopped.

At Step 608, the vice clamp on the upper vessel elevator can be opened and the upper vessel hydraulic ball screw elevator can be quickly raised to a position where it can engage the upper connector on the next train section 210 that will be installed.

At Step 609, the ball screw elevator in the middle pressure vessel 172 can engage the second train section 210 (and/or train connector) and the vice clamps close.

At Step 610, the bottom vice clamps on the drill tower (or at the bottom of the multivessel system 194) can open and the energy beam and ceramic powder supply can be engaged to begin the next burn.

At Step 611, the bottom gate valve of the upper pressure vessel can be closed and the gate valve on top of the upper pressure vessel can be opened, depressurizing the upper vessel.

At Step 612, another train section 210 can be installed in the top pressure vessel, and the top gate valve closed while the bottom gate valve is opened pressurizing all vessels. The robotic system can install bolts and torque them to specifications or, alternatively, turn the upper train section 210 fully engaging the pipe treads and joining all installed train sections 210 and the drill train 200.

At Step 613, the hydraulic drill pipe/waveguide vice clamp in the upper and middle vessels hydraulic ball screw elevator can clamp the train sections 210 (and/or train connectors) and the attachments, including the energy beam, the ceramic powder and whisker supply, burn gas waste exhaust tube, electrical connection, nitrogen gas supply, and return, robotically connected.

At Step 614, power to the energy beam drill and the ceramic material and whisker supply can be started and the next burn can begin.

At Step 615, Steps 601 through 614 can be repeated until the desired borehole depth is achieved.

At Step 616, the procedure can be reversed until the entire drill train 200 is removed.

At Step 617, the borehole 20 can be readied for geothermal energy production.

After the borehole 20 is completed, the UDW drilling system 10 can be operated using a process in reverse to withdraw the drill train 200 from the borehole 20 and dissemble the drill train 20 into train sections 210 and train connectors. The UDW drilling system 10 can be used to install a super-insulated pressure production train into the borehole 20 under sufficient nitrogen pressure to prevent borehole collapse. The pressure can be maintained while the high-pressure fluid pump 144 is engaged and the well borehole 20 is filled with water at a slightly higher pressure until the nitrogen is displaced, maintaining a constant pressure in the well bore. The inlet and outlet pressure control valve systems 148, 140 can be closed and the drilling rig can be removed to ready the borehole 20 to produce supercritical fluid from which geothermal energy can be harnessed and applied, for example, for electrical power generation or desalinization of water.

It is understood that the various disclosed embodiments are shown and described above to illustrate different possible features of the disclosure and the varying ways in which these features can be combined. Apart from combining the features of the above embodiments in varying ways, other modifications are also considered to be within the scope of the disclosure. The disclosure is not intended to be limited to the preferred embodiments described above. The disclosure encompasses all alternate embodiments that fall literally or equivalently within the scope of these claims.

The various embodiments discussed above can be mixed and matched as needed.

The terms "a," "an," and "the," as used in this disclosure, means "one or more," unless expressly specified otherwise.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The term "controller" can be used interchangeably with the terms "computer," "computing device," or "processor," which, as used in this disclosure, mean any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and their variations, as used in this disclosure, mean "including, but not limited to," unless expressly specified otherwise.

References in the disclosure to "one embodiment," "an embodiment," "an example embodiment," or "example," indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" can be interpreted to include not only the explicitly recited concentration of about 0.1 wt. % to about 5 wt. %, but also the individual concentrations (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G; F and G; D, E, and F; D, E, and G; D, F, and G; E, F, and G; or D, E, F, and G." A comma can be used as a delimiter or digit group separator to the left or right of a decimal mark; for example, "0.000, 1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" can be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

LIST OF LEGENDS IN THE DRAWINGS

10—ultra-deep well (UDW) drilling system
100: drilling platform
200: drill train
300: energy beam (EB) drill
400: controller
20—ultra-deep borehole
22: melt zone
24: borehole wall casing
26: indentation
29: exhaust gas return area
110: power generator
112: power line
120: gas generator
122: gas supply line
124: compressor
125: gas inlet valve
130: ancillary material and whisker (AMW) injector
140: flow control and well pressure control (FCPC) valve system (or outlet pressure control valve system)
141: outlet burn gas pipe to wet particle filter
144: high-pressure fluid pump 144
145: outlet shutoff valve
146: inlet-outlet (TO) flow separator
148: inlet pressure control valve system
149: waste gas exhaust
150: particle separator
160: fine mineral collection trailer
170: drilling tower
171: upstream pressure vessel
172: center pressure vessel
173: downstream pressure vessel
180: well foundation
182: well-cap casting
184: metal well seal
185: concrete studs
186: borehole liner high-temperature metal casting for flow separator
190: crane
191: pressure vessel
192: high-pressure gate valve
193: clamping mechanism
194: multivessel pressure vessel system
198: clamp motor
199: fixed bottom drill pipe clamp
1461: fixed bottom gate valve
1462: fixed hydraulic drill train conical clamping mechanism
1463: gas flow separator
1905: internal hydraulic ball screw clamping sled (or elevator)
1908: hydraulic or electric worm gear motor
1910: vessel housing
1912: drill train channel
1914: vessel base
1930: hydraulic or electric worm gear drive
1931: worm-gear powered rotating sleeve
1932: screw ball bearing rings (descending or ascending)
1934: spiral ball race
1935: rotating spiral-grooved tube
1936: flat ball bearing rings
1937: flat ball bearing race
1938: spiral ball bearing grooved Hastelloy X pressure vessel tube
1939: worm gear ring
1940: pressure vessel clamp
1941: connecting pipe
1942: ball bearings
1943: smooth bore Hastelloy X pressure vessel tube
1944: burn gas ejection piston
1945: gas flow piston rings
1946: screw plug (to install roller bearings)
1947: anti-rotational slide bars
1948: Rotec thrust bearing
1949: O-ring seals
200—Drill train
210: train section 220: inner network tier of access channels
222: electrical cable channel
224: plasma gas channel
225: cross member connecting inner network tier to middle network tier
226: electrode feed channel
230: middle network tier of access channels
232: cooling water supply channel
234: nitrogen purge gas supply channel
235: cross member connecting middle network tier to outer network tier
236: a hot water return channel
238: nitrogen purge gas supply channel
240: outer network tier of access channel
242: ancillary material and whisker (AMW) supply channel
245: separation strut
247: pocket weld or seam weld
250: outer wall of outer network tier
252: carbon fiber ceramic wrapping layer
255: burn gas return area
260: plug weld slot
270: engagement member
280: circumferential weld
299: cooling water area to cool the interior portions from the exhaust burn gas area
2121: extendable well pressure vessel claw arm system
2122: detent
2123: toothed borehole gripper
2124: pressure activated cylinder
300: EB DRILL
305: waveguide

The invention claimed is:

1. A multivessel system comprising a plurality of pressure vessels for drilling an ultra-deep borehole into the Earth's lithosphere, the system comprising:
a plurality of gate valves, each gate valve being configured to provide a hermetic seal between at least two spaces;
a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a drill train channel, the first pressure vessel further comprising a first vessel downstream opening;
a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the drill train channel, the second pressure vessel further comprising a second vessel downstream opening;
a third pressure vessel comprising a third vessel upstream opening configured to receive the train section from the second vessel downstream opening through a third one of said plurality of gate valves, the third pressure vessel being configured with a smooth cylinder bore and a burn gas ejection piston with a center hole through which the train section passes and containing a pressure sealing clamp configured to hold and connect the train section to a drill train, the third pressure vessel comprising a third vessel downstream opening;
an input-output separator configured to segregate an exhaust waste gas up-flowing from the borehole from a gas being supplied into the borehole; and
a drill pipe clamp configured to engage and hold the drill train in the borehole,
wherein each of said first vessel elevator and said second vessel elevator includes a clamp configured to engage and hold the train section as the respective first vessel elevator or the second vessel elevator moves along the drill train channel.

2. A multivessel system comprising a plurality of pressure vessels for drilling an ultra-deep borehole into the Earth's lithosphere, the system comprising:
a plurality of gate valves, each gate valve being configured to provide a hermetic seal between at least two spaces;
a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a drill train channel, the first pressure vessel further comprising a first vessel downstream opening;
a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the drill train channel, the second pressure vessel further comprising a second vessel downstream opening; and
a drill pipe clamp configured to engage and hold a drill train in the borehole,
wherein each of said first vessel elevator and said second vessel elevator includes a clamp configured to engage and hold the train section as the respective first vessel elevator or the second vessel elevator moves along the drill train channel.

3. The multivessel system in claim 2, further comprising:
a third pressure vessel comprising a third vessel upstream opening configured to receive the train section from the second vessel downstream opening,
wherein at least one of the first pressure vessel, the second pressure vessel and the third pressure vessel comprises a robotic arm that is configured to connect the train section to the drill train.

4. The multivessel system in claim 3, wherein the third pressure vessel comprises a smooth internal cylinder bore and a piston having a pressure sealing clamp attached to the second vessel elevator by a fixed steel tube to allow the drill train section to pass through the piston and be pressure sealed and at the same time allow an exhaust waste gas to be ejected and separated from an incoming at least one of a cooling liquid, an electrical supply cable, a gas supply, and an ancillary material and whisker feed.

5. The multivessel system in claim 2, wherein the first vessel elevator or the second vessel elevator comprises an internal spiral hydraulic ball screw elevator.

6. The multivessel system in claim 5, wherein the drill pipe clamp comprises a fixed hydraulic conical clamp located between the third pressure vessel and a gas flow separator.

7. The multivessel system in claim 2, wherein a pressure sealing clamp comprises a hydraulic conical clamping mechanism mechanism for clamping at least one a waveguide, a drill tube, a water cooling system, an electrical supply cable, a gas supply, an ancillary material and whisker feed, and a burn gas waste tube.

8. The multivessel system in claim 5, wherein the ancillary material and whisker feed comprise a ceramic powder and ceramic whiskers.

9. The multivessel system in claim 2, further comprising an input-output separator configured to segregate an exhaust waste gas up-flowing from the borehole from a gas supply to the borehole.

10. The multivessel system in claim 2, further comprising an energy beam drill, wherein the energy beam drill comprises at least one of a plasma-arc infrared beam drill, a laser guided plasma beam drill and a direct electrical discharge energy drill.

11. The multivessel system in claim 10, wherein the energy beam comprises:
 a laser guided plasma beam drill or a direct electrical discharge energy beam drill attached to a distal end of the drill train;
 a plasma arc infrared energy beam drill that comprises an extendable drill tube; and
 one or more lower mounted waveguide sections configured to drill the borehole and form a ceramic borehole liner by transmitting a directed energy beam to vaporize rock in a geological formation.

12. The multivessel system in claim 10, wherein the drill pipe clamp is configured to hold and lower the drill train as it descends through a geological formation to form a ceramic borehole liner at the circumference of the borehole, while maintaining a predetermined fixed distance between energy beam drill and a melt created at a bottom of the borehole.

13. The multivessel system in claim 2, wherein the drill train comprises a carbon fiber-ceramic layer.

14. The multivessel system in claim 2, further comprising:
 a particle separator configured to segregate fine particles from an exhaust waste gas.

15. The multivessel system in claim 2, wherein the drill train comprises high temperature Hastelloy X or nickel alloy.

16. The multivessel system in claim 2, wherein the drill train comprises train connectors between each pair of train sections.

17. The multivessel system in claim 16, wherein the train connectors each include an upstream sub-connector and a downstream sub-connector.

* * * * *